United States Patent
Kim

(10) Patent No.: US 9,861,231 B2
(45) Date of Patent: Jan. 9, 2018

(54) ROASTER

(71) Applicant: Sejin Hightech Co., Ltd, Incheon (KR)

(72) Inventor: Young Bong Kim, Incheon (KR)

(73) Assignee: SEJIN HIGHTECH CO., LTD, Incheon (KR)

( * ) Notice: Subject to any disclaimer, the term of this patent is extended or adjusted under 35 U.S.C. 154(b) by 336 days.

(21) Appl. No.: 14/427,386

(22) PCT Filed: Jun. 26, 2013

(86) PCT No.: PCT/KR2013/005653
§ 371 (c)(1),
(2) Date: Mar. 11, 2015

(87) PCT Pub. No.: WO2014/042342
PCT Pub. Date: Mar. 20, 2014

(65) Prior Publication Data
US 2015/0257594 A1     Sep. 17, 2015

(30) Foreign Application Priority Data

Sep. 12, 2012  (KR) .................. 10-2012-0100922

(51) Int. Cl.
*A47J 37/07*   (2006.01)
*A47J 37/06*   (2006.01)
*A47J 27/12*   (2006.01)

(52) U.S. Cl.
CPC ........... *A47J 37/0754* (2013.01); *A47J 27/12* (2013.01); *A47J 37/06* (2013.01); *A47J 37/0763* (2013.01)

(58) Field of Classification Search
CPC .... A47J 37/0754; A47J 37/0763; A47J 37/06; A47J 27/12
See application file for complete search history.

(56) References Cited

U.S. PATENT DOCUMENTS 3,455,233 A * 7/1969 Cable .................. A47J 37/0704
                                                        99/443 R
3,868,943 A * 3/1975 Hottenroth .......... A47J 37/0754
                                                        126/25 R
(Continued)

FOREIGN PATENT DOCUMENTS

KR          200169907        11/1999
KR      1020010078625         8/2001
(Continued)

OTHER PUBLICATIONS

International Search Report—PCT/KR2013/005653 dated Nov. 20, 2013.

*Primary Examiner* — Sean Michalski
(74) *Attorney, Agent, or Firm* — Cantor Colburn LLP

(57) ABSTRACT

A roaster comprises a main container equipped with the space in the inner portion; an upper supporter including a flame hole equipped at the side facing the bottom side of the main container, and a roasting plate supporting part equipped at the circumference position of the flame hole, and is combined to the main container; a fuel vessel which has a fuel filling part is formed in the inner space and a spacer equipped in the outer periphery position of the fuel filling part, and which is positioned in the main container to be positioned at the opposite direction to the flame hole of the upper supporter and which is arranged as the state separated from the spacer.

5 Claims, 17 Drawing Sheets

(56) References Cited

U.S. PATENT DOCUMENTS

| | | | | |
|---|---|---|---|---|
| 3,915,144 A * | 10/1975 | Tomita | F24B 3/00 | 126/25 B |
| 3,933,145 A * | 1/1976 | Reich | A47J 37/0754 | 126/25 B |
| 3,982,522 A * | 9/1976 | Hottenroth | F24B 1/202 | 126/146 |
| 3,997,761 A * | 12/1976 | Gebien | H05B 3/06 | 219/450.1 |
| 4,211,206 A * | 7/1980 | Darbo | A47J 37/0763 | 126/25 R |
| 4,446,846 A * | 5/1984 | Hahn | A47J 37/0713 | 126/25 R |
| 4,524,751 A * | 6/1985 | Hoglund | A47J 37/0713 | 126/25 A |
| 4,699,120 A * | 10/1987 | Ogden | A47J 37/0704 | 126/25 A |
| 4,729,297 A * | 3/1988 | Iranzadi | A47J 37/01 | 99/339 |
| 4,867,050 A * | 9/1989 | Patenaude | A47J 37/0754 | 126/15 A |
| 4,969,449 A * | 11/1990 | Levin | A47J 37/0786 | 126/221 |
| 5,009,151 A * | 4/1991 | Hungerford | A47J 37/0786 | 126/25 R |
| 5,154,158 A * | 10/1992 | Lindsey | A45C 11/20 | 126/25 R |
| 5,154,159 A * | 10/1992 | Knafelc | A47J 37/0704 | 126/154 |
| 5,331,886 A * | 7/1994 | Basel | A47J 37/0682 | 99/446 |
| 5,359,988 A * | 11/1994 | Hait | A47J 37/0704 | 126/153 |
| 5,906,152 A * | 5/1999 | Alcorn | A47J 37/0786 | 99/399 |
| 5,967,135 A * | 10/1999 | Shariat | A47J 37/0682 | 126/21 A |
| 6,349,713 B1 * | 2/2002 | Toyama | A47J 37/0763 | 126/25 R |
| 6,520,174 B1 * | 2/2003 | Scigliuolo | A47J 37/0786 | 126/25 R |
| 6,742,446 B2 * | 6/2004 | McLemore | A47J 43/18 | 99/416 |
| 6,941,941 B1 * | 9/2005 | Hall | A47J 37/0704 | 126/25 R |
| 6,959,951 B2 * | 11/2005 | Amodeo | A47J 45/10 | 294/10 |
| 8,087,410 B2 * | 1/2012 | Gregory | F24C 1/02 | 126/275 E |
| 8,220,449 B2 * | 7/2012 | Rheault | A47J 33/00 | 126/25 R |
| 8,973,758 B2 * | 3/2015 | Nunnery | A47J 37/0786 | 110/165 R |
| 2005/0205076 A1 * | 9/2005 | Boucher | A47J 37/0704 | 126/25 R |
| 2007/0272229 A1 * | 11/2007 | Becker | A47J 37/0754 | 126/25 B |
| 2007/0277807 A1 * | 12/2007 | Taban | A47J 37/0763 | 126/275 R |
| 2013/0228161 A1 * | 9/2013 | Ahmed | A47J 37/0727 | 126/25 R |
| 2015/0114238 A1 * | 4/2015 | Palermo | A47J 37/0623 | 99/401 |
| 2017/0215641 A1 * | 8/2017 | DeBruler | A47J 37/0763 | 126/25 R |
| 2017/0215642 A1 * | 8/2017 | Jenkins | F24C 3/14 | 99/340 |

FOREIGN PATENT DOCUMENTS

| | | |
|---|---|---|
| KR | 200321550 | 7/2003 |
| KR | 200377597 | 2/2005 |
| KR | 2020090004651 | 5/2009 |

* cited by examiner

ROASTER

BACKGROUND OF INVENTION

Field of the Invention

The invention relates to a roaster, and more specifically, to a roaster which has the structure the heat of the flame is to the utmost a little bit delivered to the around while the heat of the flame is to the fullest a lot delivered to the roasting object food so that the thermal efficiency may be raised and therefore may be used in the indoor like as the general home as well as in the outdoor with convenience and safety.

Moreover, the invention relates to a new roaster which can be conveniently used for various uses like as the user may feel funny more while eating roasted meat because it has special structure like as the user may eat the other food like the pot stew besides eating the roasted meat.

And the invention relates to new roaster which uses mainly charcoal as fuel. The roaster according to the invention minimizes the conditions that the heat at the charcoal fire flame source is transmitted to the around and the around container portion is overheated. Accordingly the invention has the various useful functions like as preventing the user to be scalded while roasting the meat.

Description of the Related Art

Generally, the methods for roasting the meat may be classified roughly as an indirect roasting method for roasting the meat using the indirect cookware and a direct roasting method for directly roasting the meat by the direct fire roaster like as a charcoal fire roaster etc. In case of the indirect roasting method utilizing the indirect cookware like as an oven, the indirect cookware heats the inner portion of the predetermined section to make the meat roasted by the convection heat and heated air. In case of the direct roasting method, the direct fire roaster directly exposes food to the flame like as the charcoal fire and so on etc to make the meat roasted by the direct flame. When the meat is roasted by direct fire flame, if the charcoal fire is used for roasting the meat, there is various advantages like as the scent of charcoal may be permeated into the meat so that the taste of the meat get better.

The conventional roaster of the prior art includes a support container wherein the flame outlet port is equipped in the central part and the tray (26) of the trench-type is equipped around the flame outlet port and the oil generated while roasting the meat may be collected in the water filled in the tray, a roasting plate which is supported on the support container and has flam inlet port in the central portion. In case of the prior roaster, the flame comes up through the central part flame outlet of the roasting plate support stand and flame inlet port of the roasting plate so that the meat (for example, pork belly and so on) is roasted as the direct fire type.

Meanwhile, there are many cases that said roaster is used in the indoor like as the general home or in the outdoor. What is importantly considered in the roaster is that the heat of the flame is to the utmost a little bit delivered to the around while the heat of the flame is to the utmost a lot delivered to the roasting object meat so that the loss of fire is reduced to the utmost. If the heat of the flame is not burnt down around the meat to the utmost while the heat of the flame is delivered to the meat to the utmost, it will be good for the safety or the thermal efficiency.

However, in case of the prior roaster, there is disadvantages that it is not preferable for the safety or the thermal efficiency described in the above because the flame for roasting the meat is not concentrated to the roasting plate and is transmitted to the surroundings around the position where the meat is being roasted so that the loss of the heat may be increased so much. That is, because there are many cases the heat of fire is directly transmitted to the roasting plate from the downside of the support container which supports the roasting plate, the oil falling down from the roasting plate may be received in the tray so that the heat transmission may be decreased by the water filled in the tray. But, even if said roaster is used at the state that water is filled up in the roasting plate support container, it is insufficient that said roaster solve the problem due to the direct overheat by the flame, and said roaster is undesirable character because the loss of heat is so much while the fuel (the source of the flame) is under combustion. And there is a problem that it is difficult to expect the convenience like as the user may roast to eat the meat after he/she moves said roaster to desired place (for example, to the outdoor from the indoor or to the indoor from the outdoor) because the heat of the roaster is transmitted to the other part around the part where the meat is roasted. That is, said roaster of the prior art has the problem it is difficult as to the portability of the food cooking place.

SUMMARY OF THE INVENTION

The invention has been made to solve the foregoing problems with the prior art, and therefore the purpose of the invention is to provide a roaster which has the structure the heat of the flame is to the utmost a little bit delivered to the around while the heat of the flame is a lot delivered to the roasting object food and the thermal efficiency may be raised so that the user may use in the outdoor as well as in the indoor like as general home and so on at the safe and convenient state.

Moreover, the invention relates to a new roaster which can be conveniently used for various uses like as the user may feel funny more while eating roasted meat because it has special structure like as the user may eat the other food like the pot stew besides eating the roasted meat.

And, the invention relates to new roaster which uses mainly charcoal as fuel and minimizes the conditions that the heat at the charcoal fire flame source is transmitted to the around and the around container portion is overheated so that the various useful functions like as preventing the user to be scalded while roasting the meat may be expected.

BRIEF DESCRIPTION OF THE DRAWINGS

The above and other aspects, features and advantages of certain exemplary embodiments of the invention will be more apparent from the following description taken in conjunction with the accompanying drawings, in which.

DETAILED DESCRIPTION OF THE INVENTION

Figure 1:
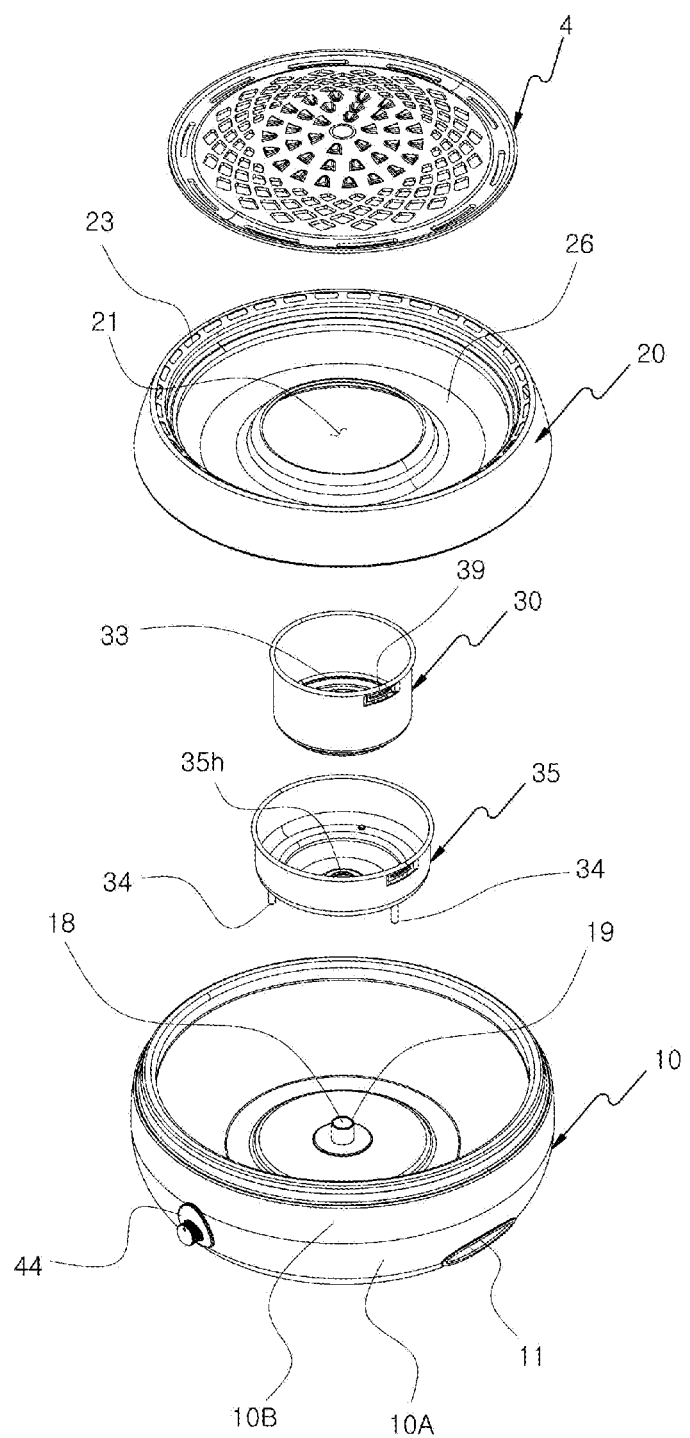
FIG. 1 is a disassembled perspective view of the main part of the invention.
Figure 2:
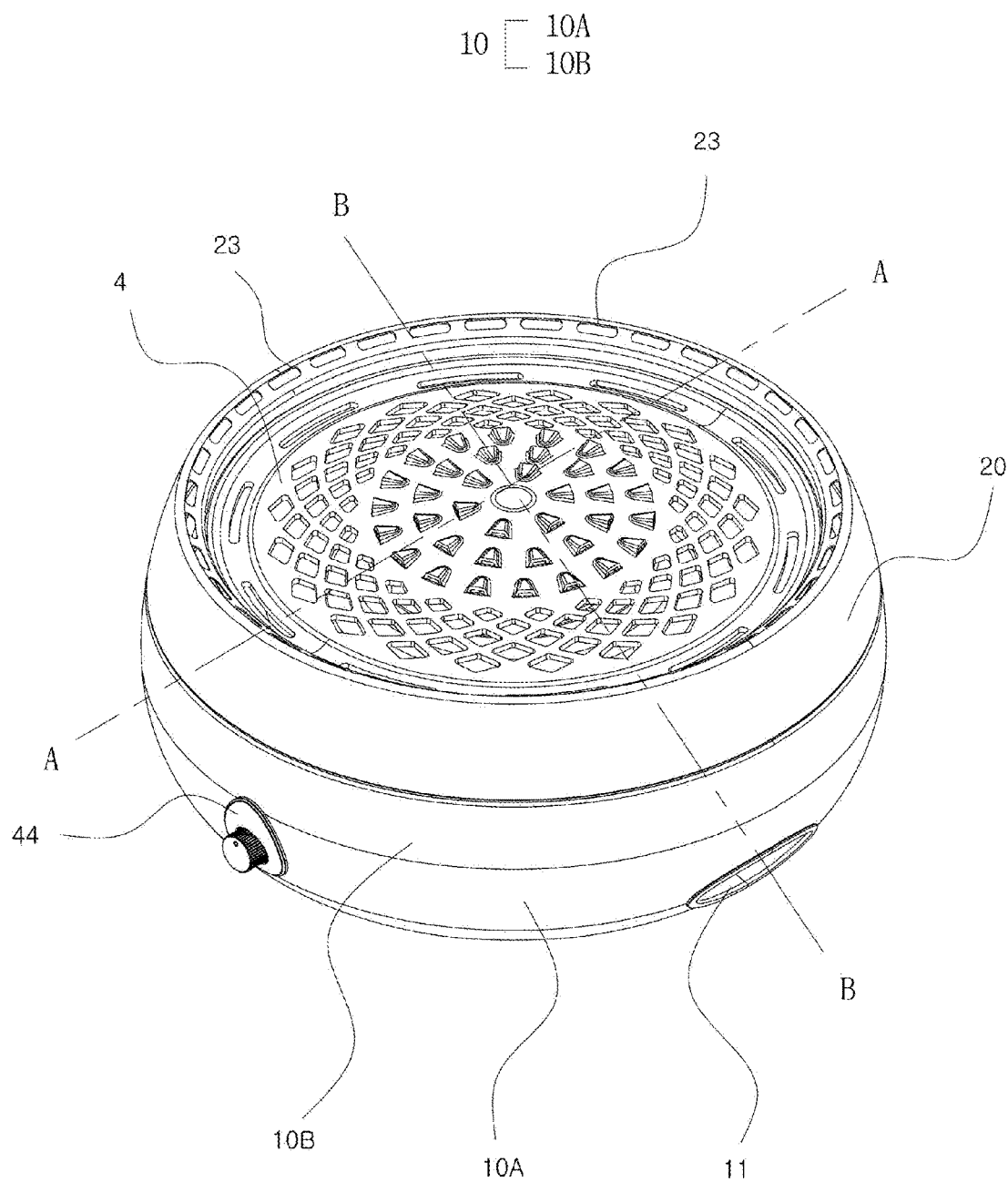
FIG. 2 is a perspective view showing the active using state of the main part illustrated in FIG. 1.
Figure 3:
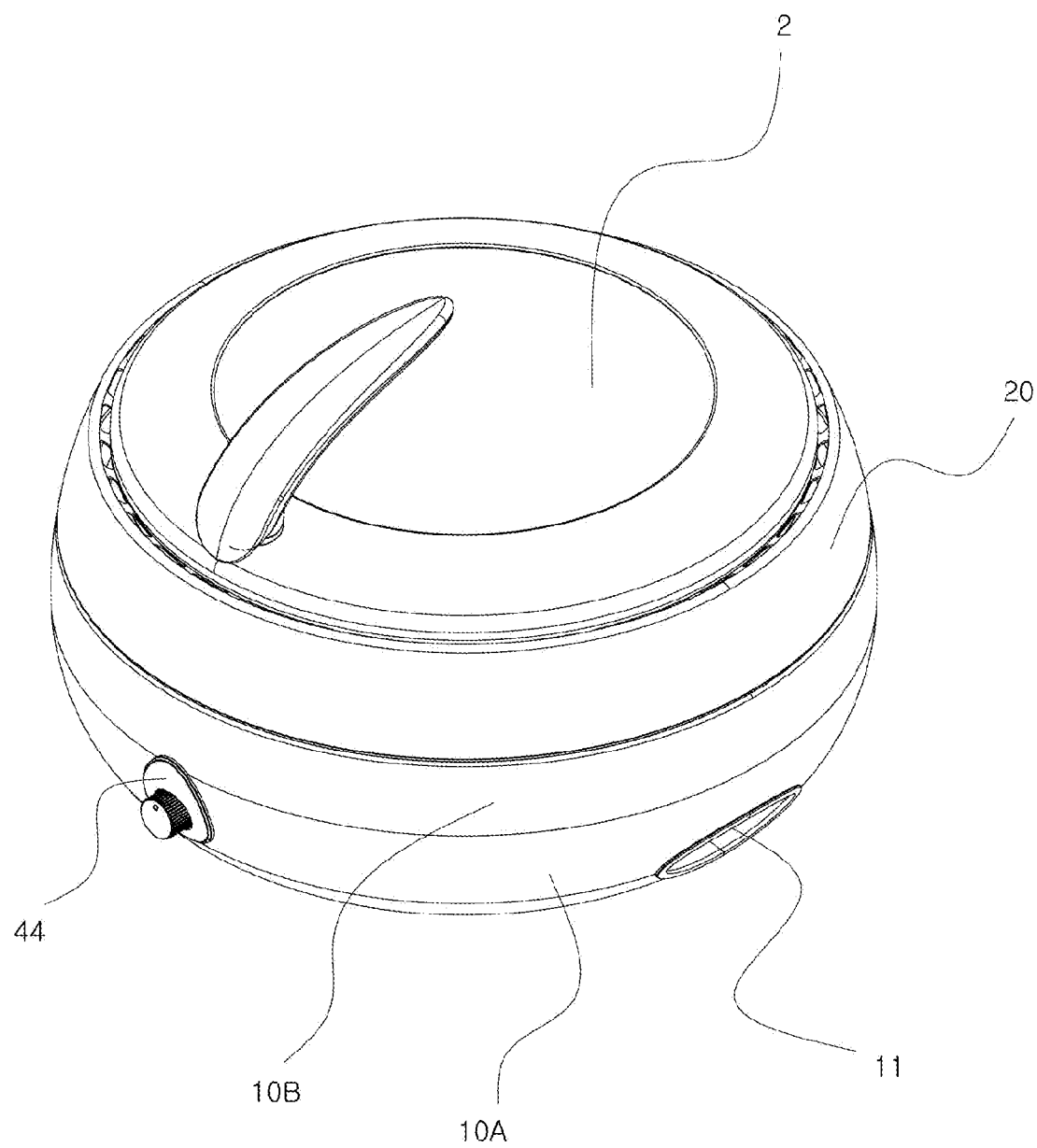
FIG. 3 is a perspective view showing the state covering the lid on the main part in FIG. 2.
Figure 4:
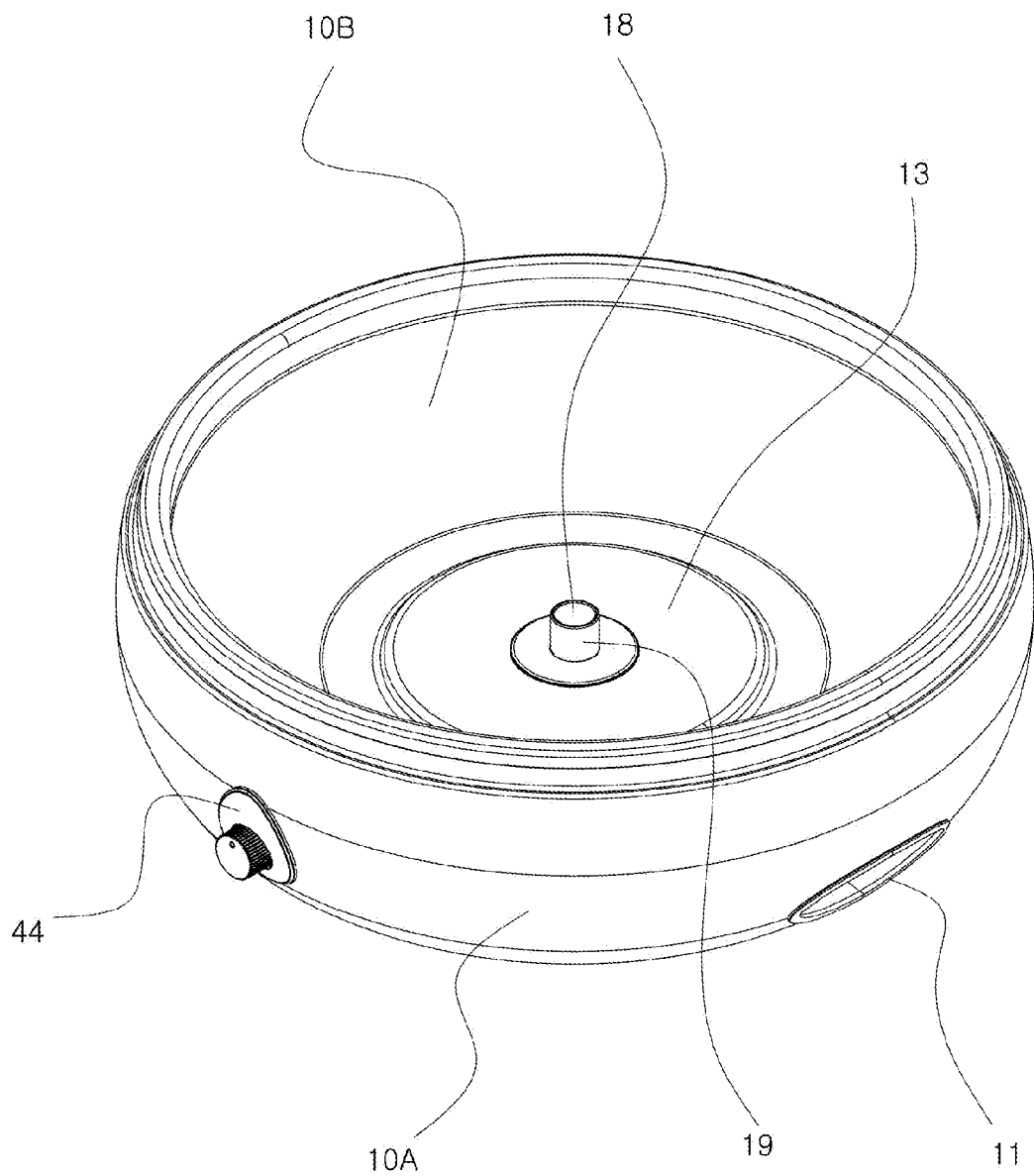
FIG. 4 is a perspective view of the main container which is the main part illustrated in FIG. 1.
Figure 5:
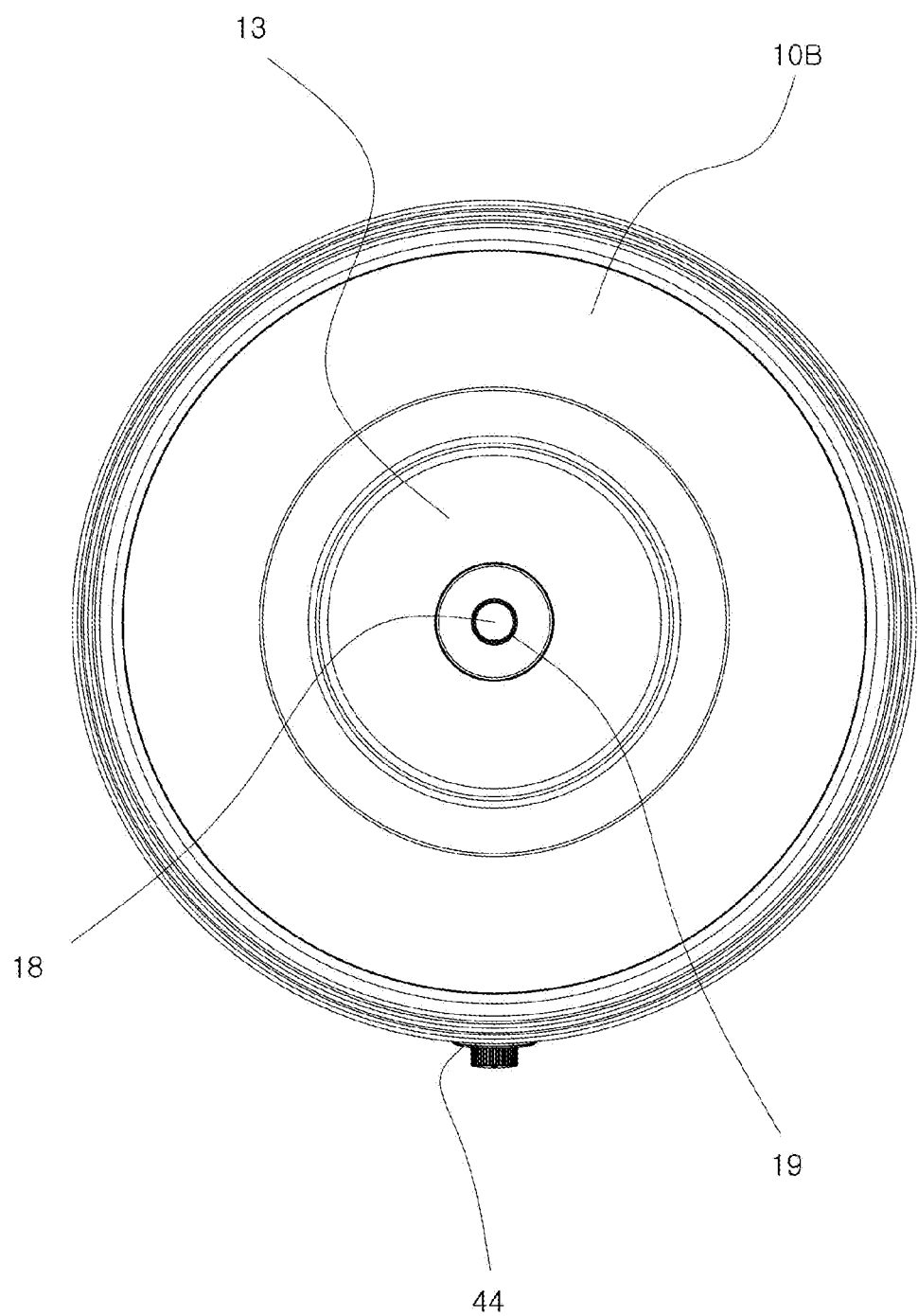
FIG. 5 is a plane view of FIG. 4.
Figure 6:
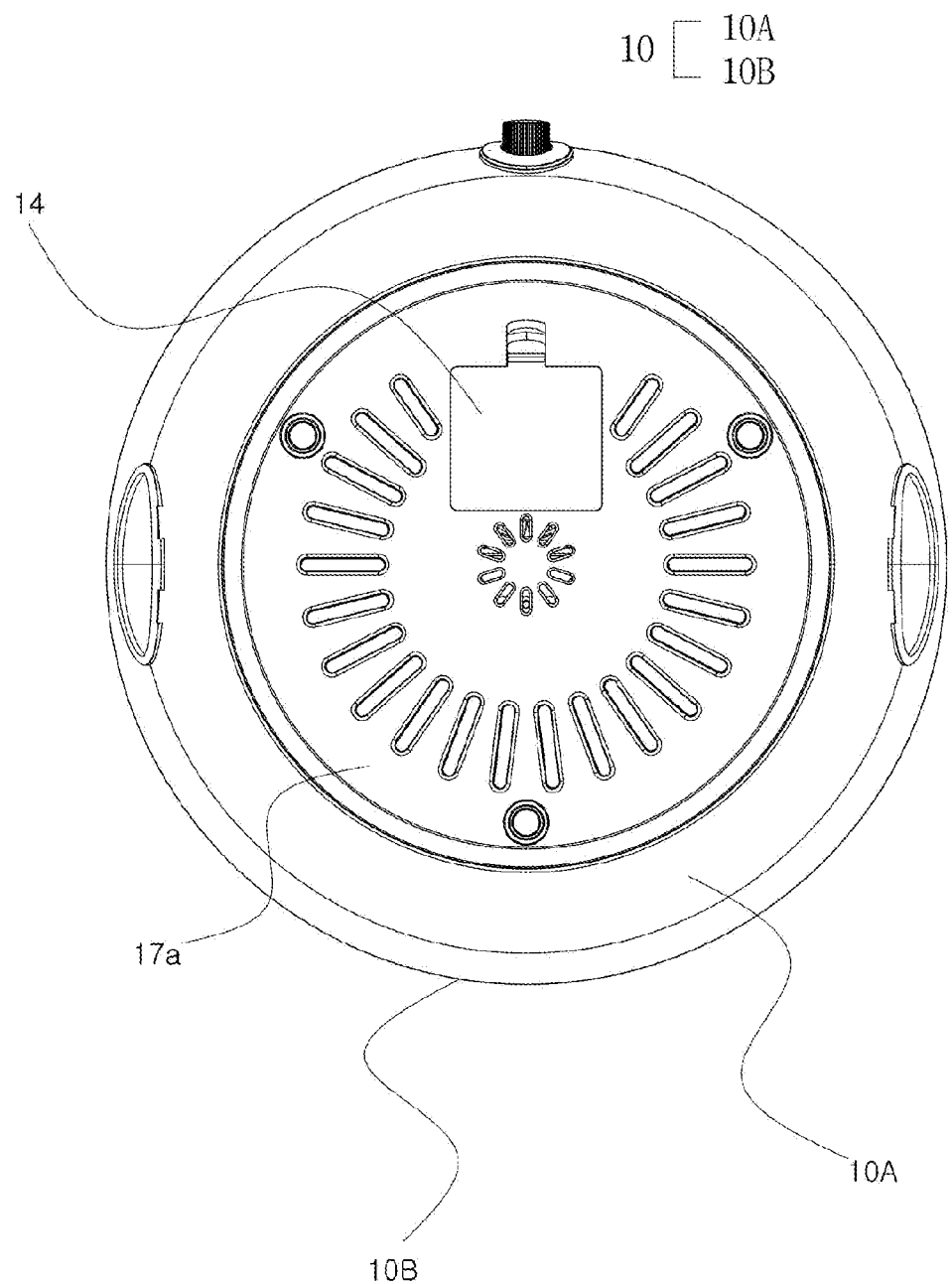
FIG. 6 is a bottom view of FIG. 4.
Figure 7:
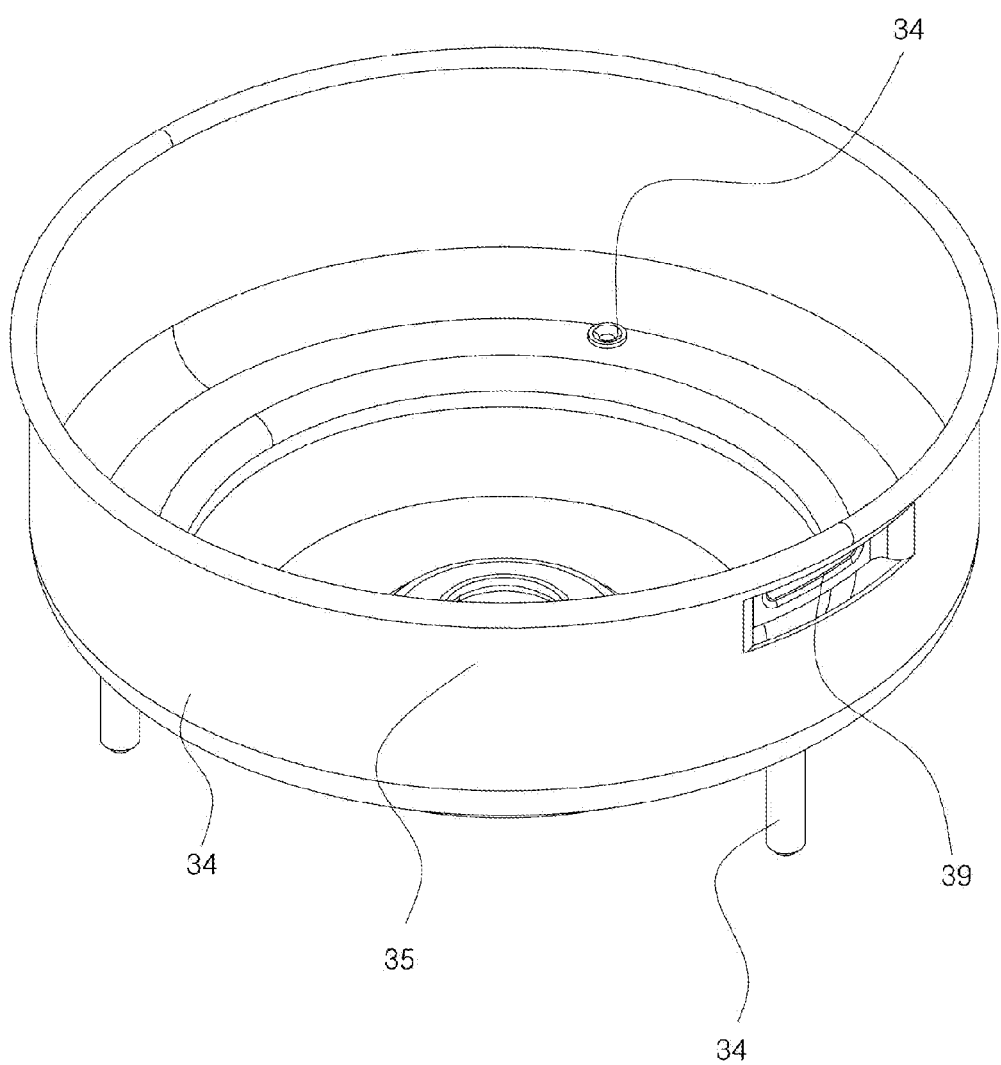
FIG. 7 is a perspective view of the fire fuel vessel which is the other main part in FIG. 1.
Figure 8:
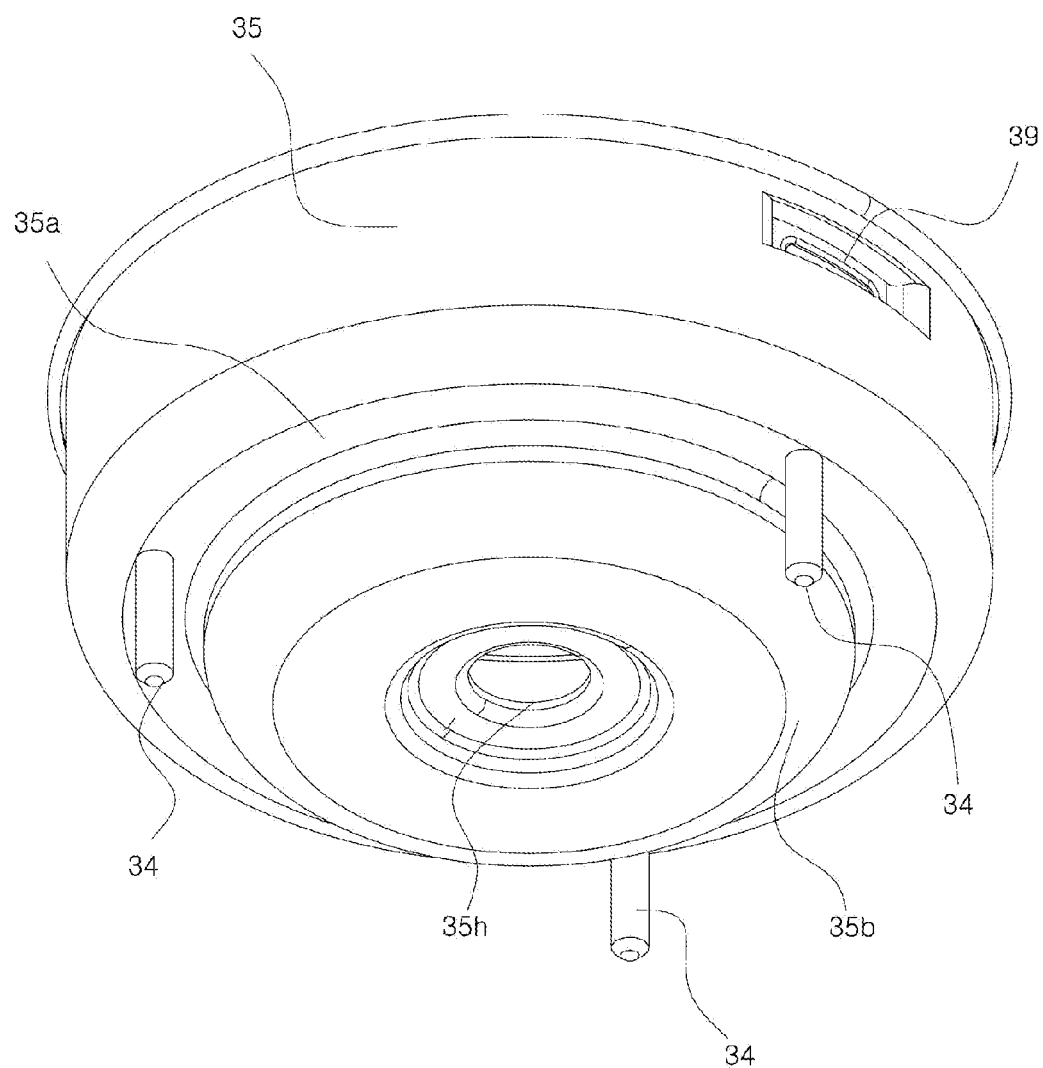
FIG. 8 is a perspective view showing the bottom surface of FIG. 7.
Figure 9:
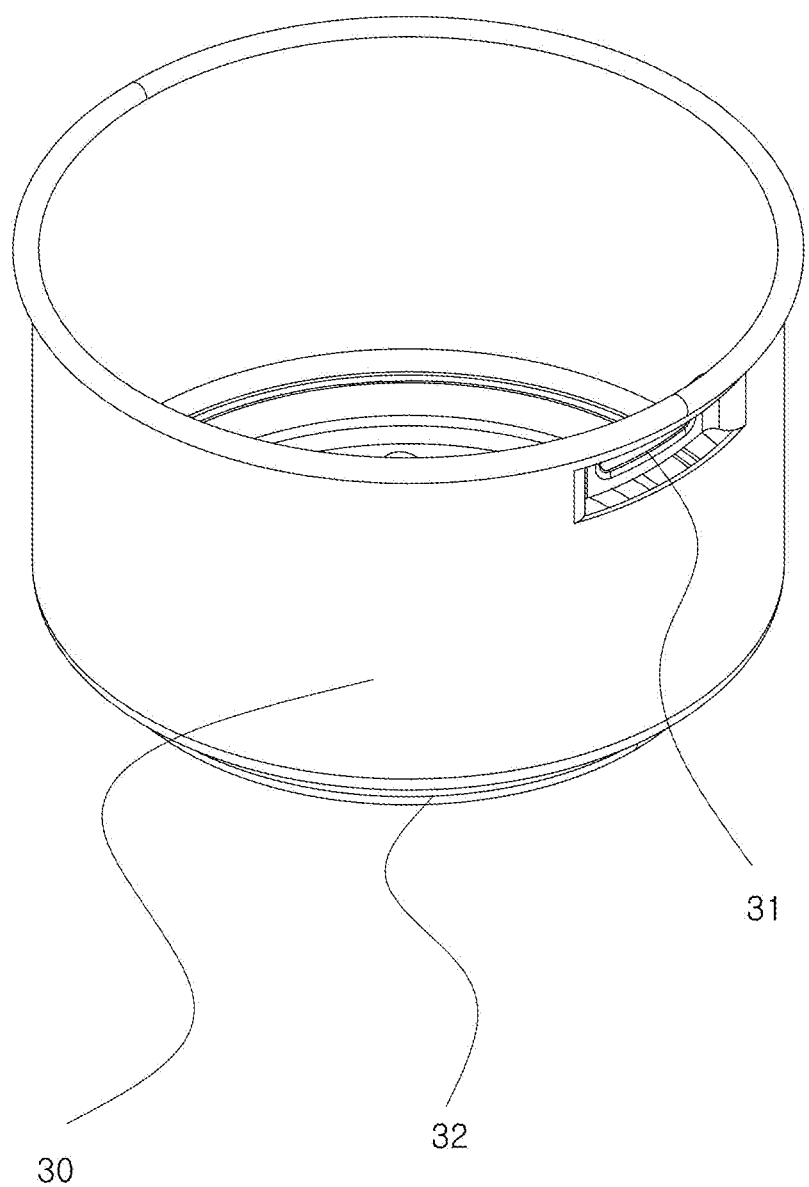
FIG. 9 is a perspective view of the fuel vessel illustrated in FIG. 1.
Figure 10:
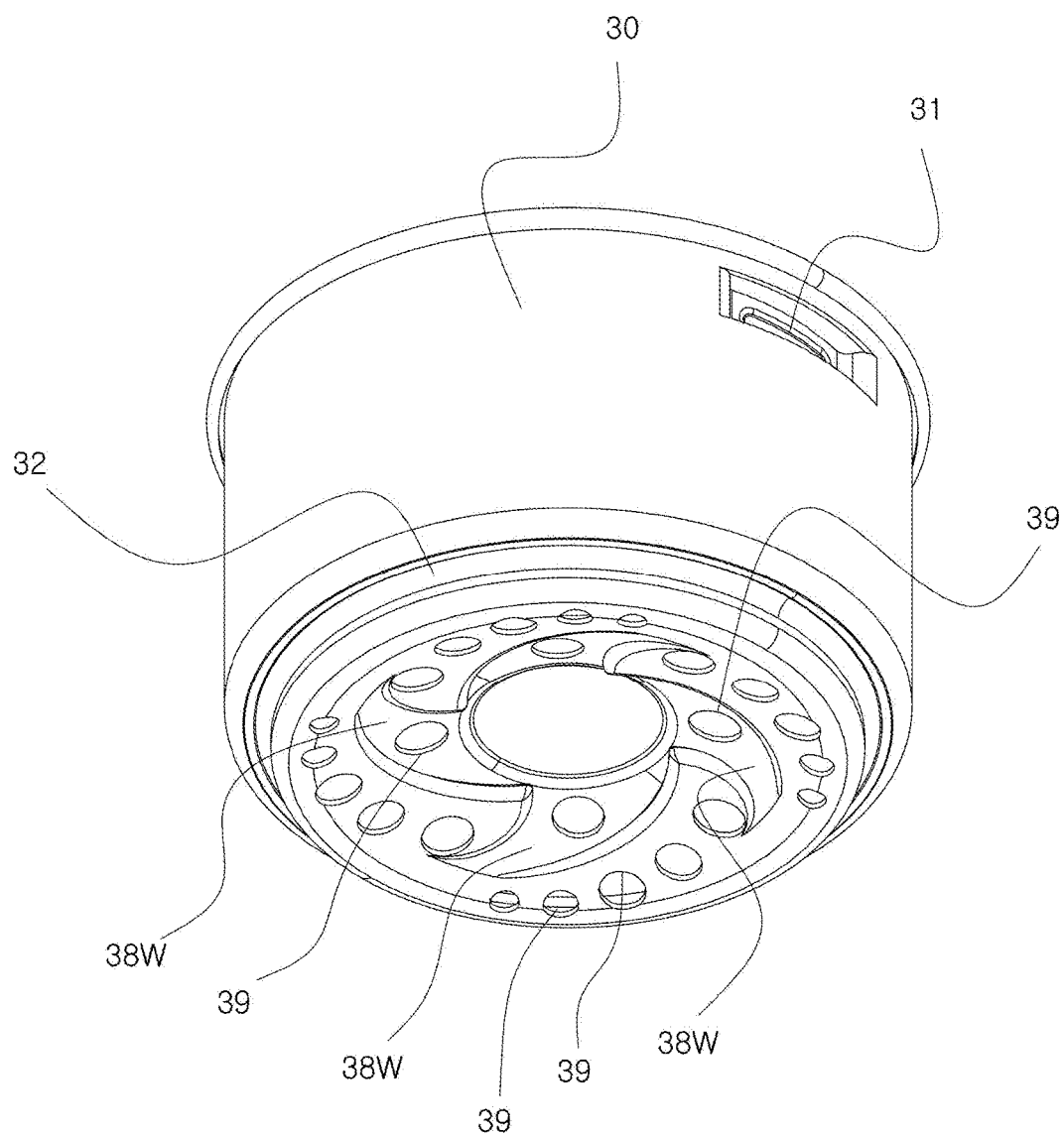
FIG. 10 is a perspective view showing the bottom surface of FIG. 9.
Figure 11:
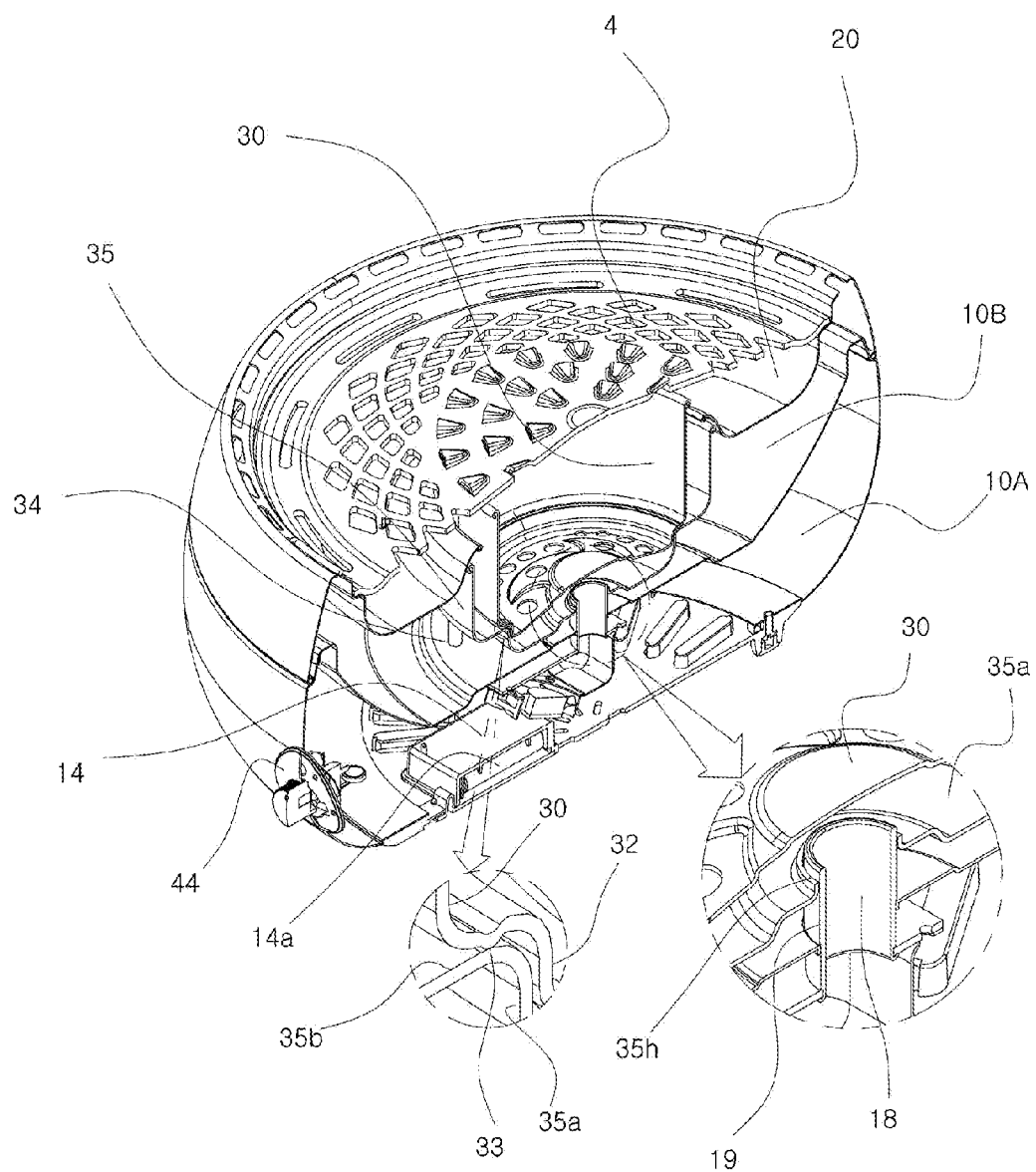
FIG. 11 is a semi-cutted perspective view of the main part illustrated in FIG. 2.
Figure 12:
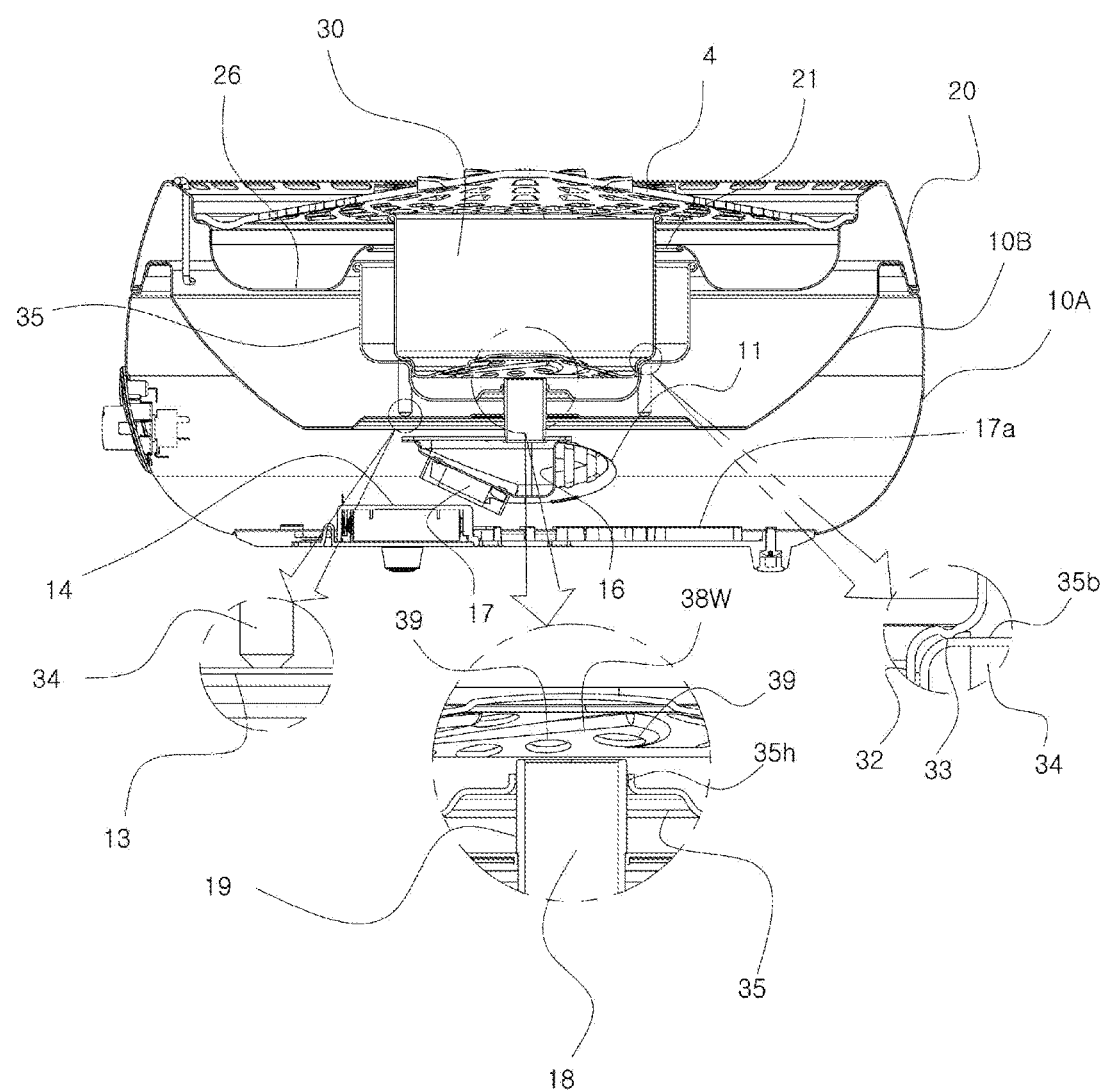
FIG. 12 is a A-A line cross-sectional view of FIG. 2.
Figure 13:
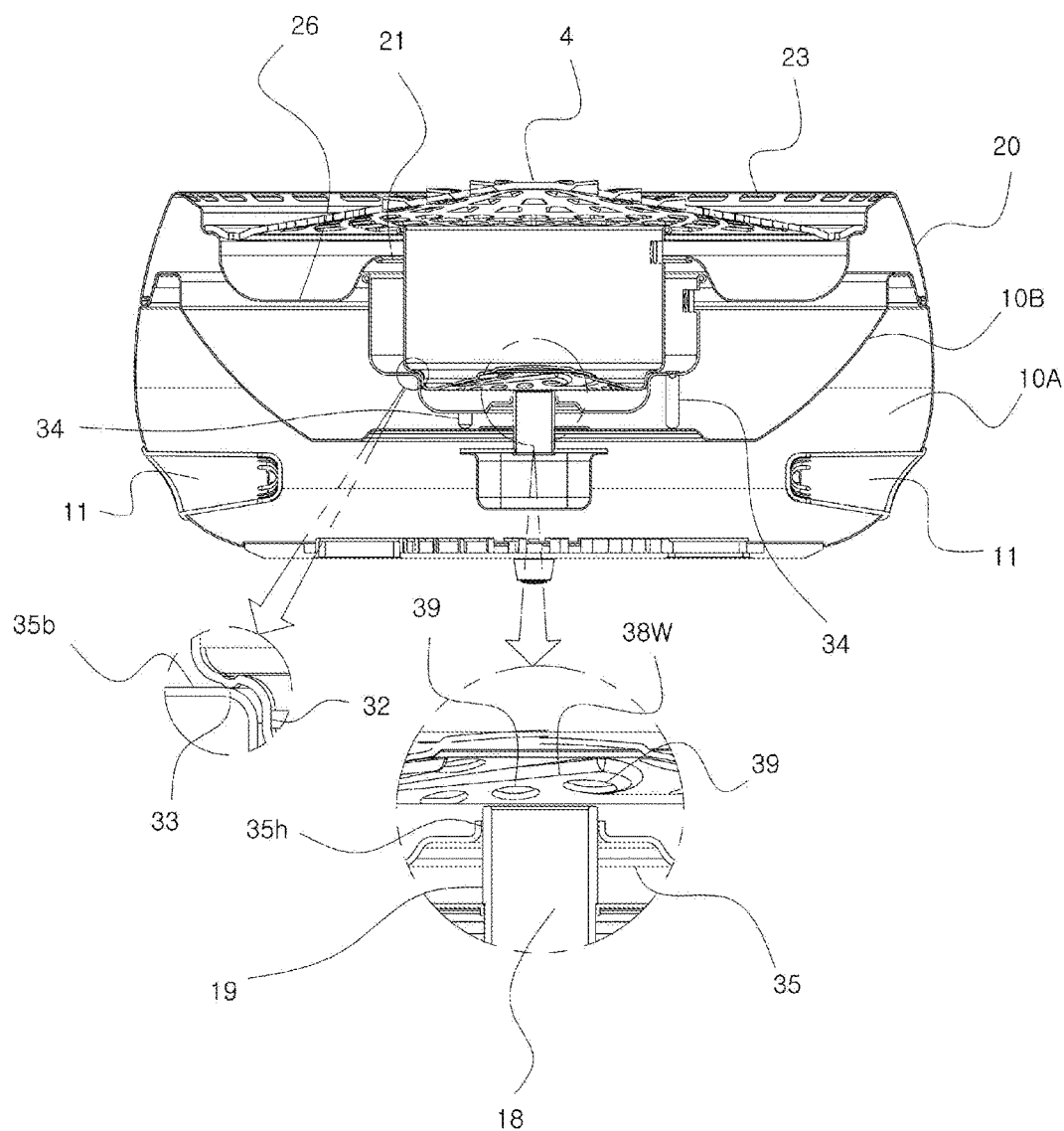
FIG. 13 is a B-B line cross-sectional view of FIG. 2.
Figure 14:
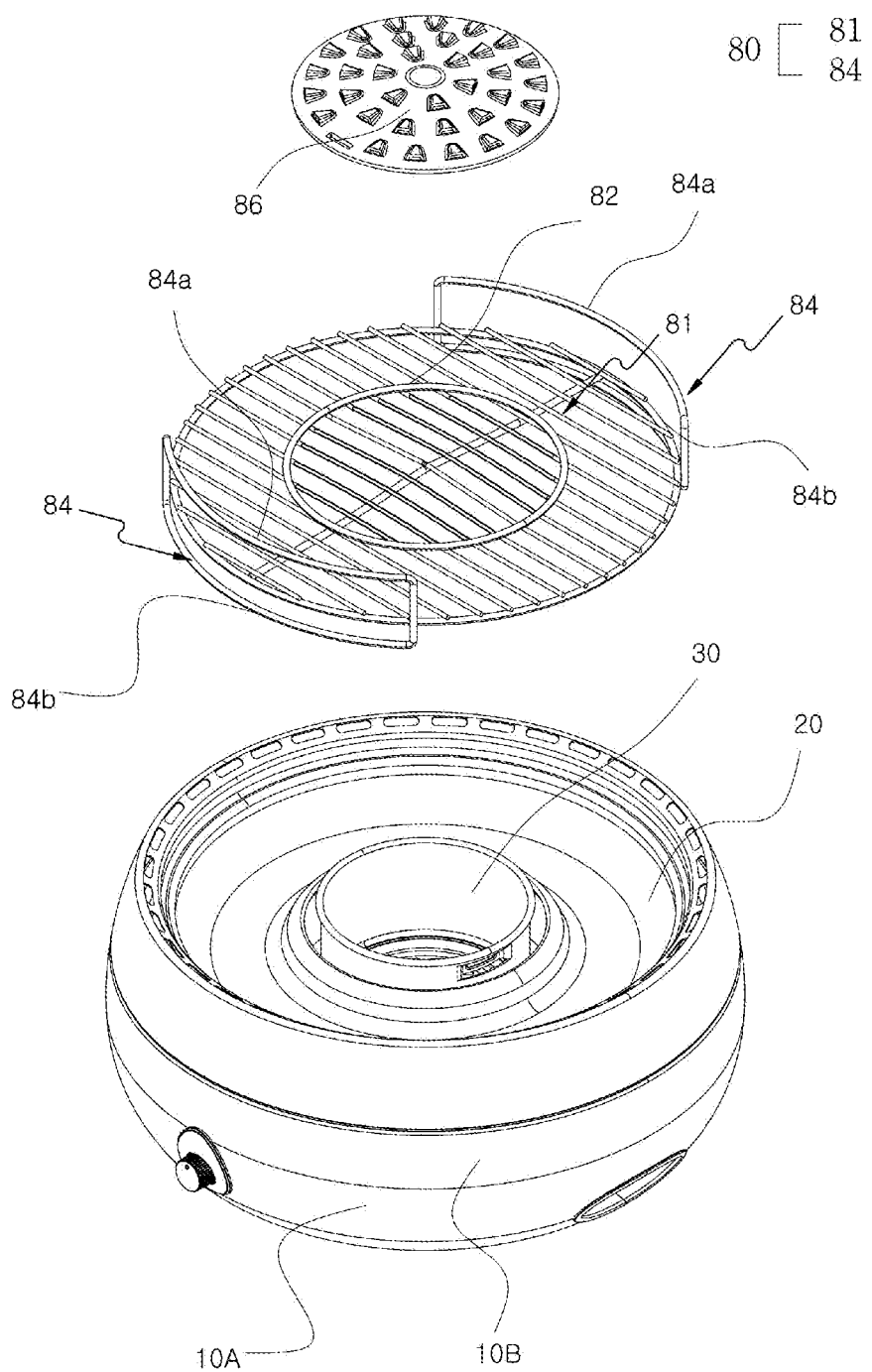
FIG. 14 is a perspective view showing the disassembled state of the main part of according to another embodiment of the invention.
Figure 15:
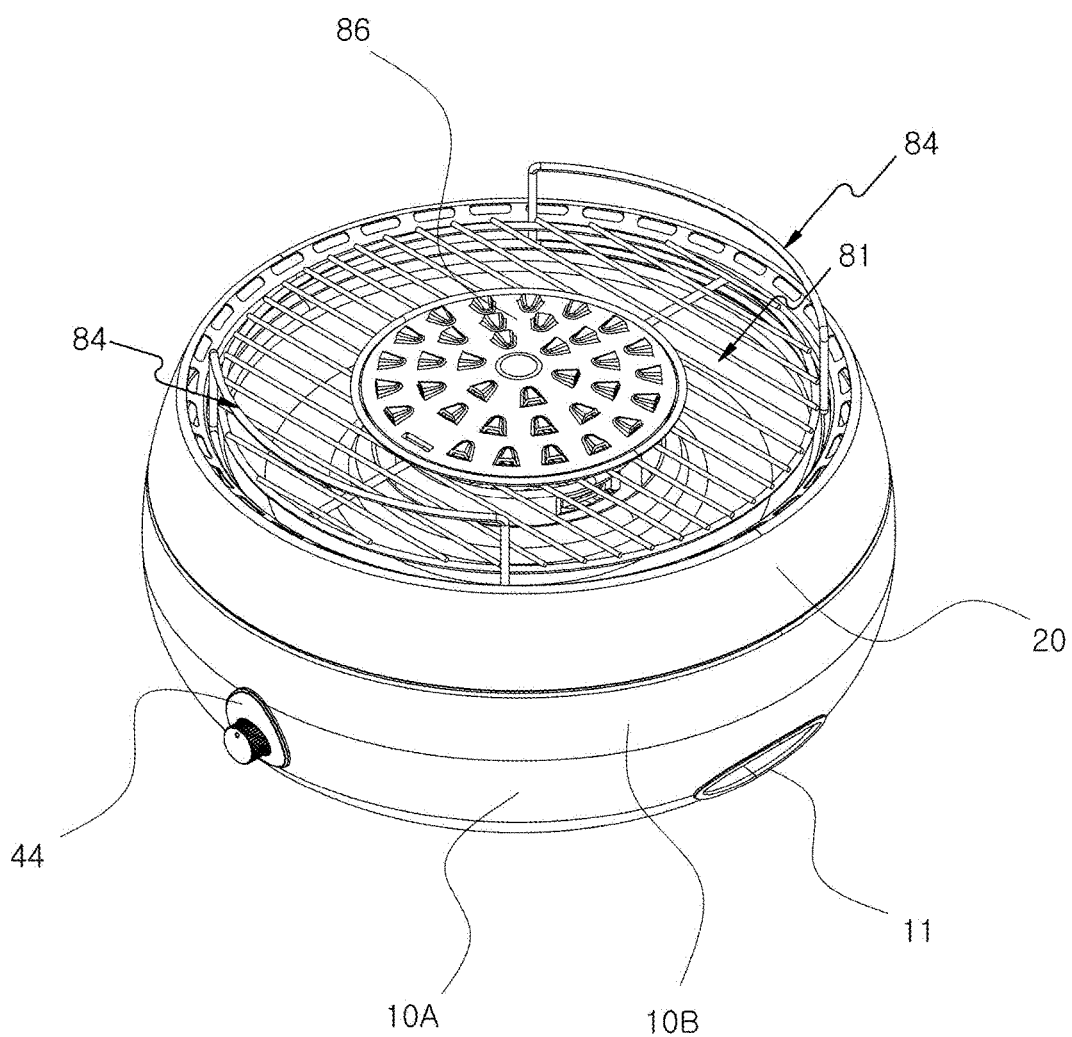
FIG. 15 is a perspective view showing the active using state of another embodiment illustrated in FIG. 14.
Figure 16:
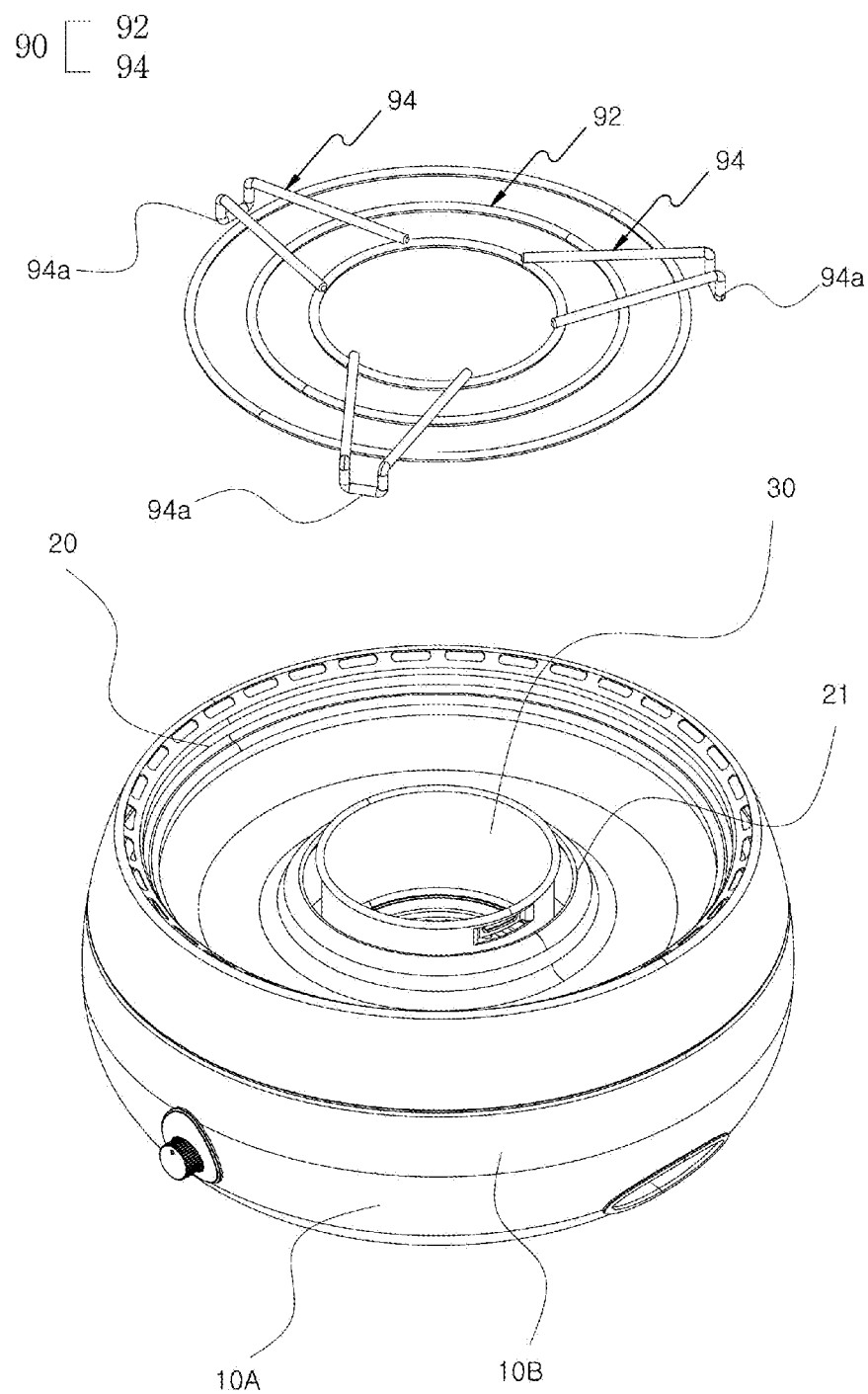
FIG. 16 is a perspective view showing the dissembled state of the main part according to the other embodiment of the invention.
Figure 17:
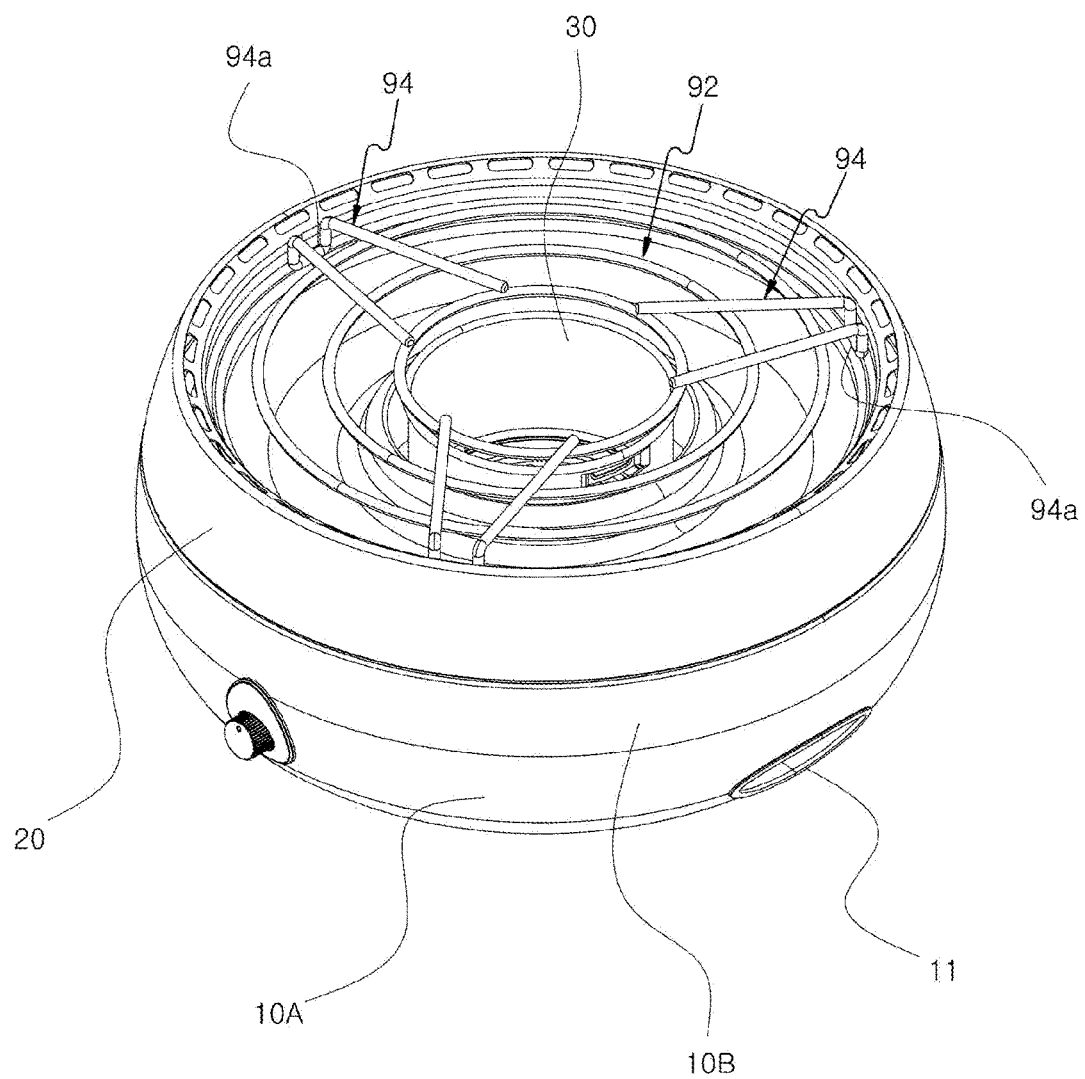
FIG. 17 is a perspective view showing the active using state of the other embodiment illustrated in FIG. 16.

The invention will now be described more fully hereinafter with reference to the accompanying drawings, in which exemplary embodiments thereof are shown.

Referring to the attached drawings, the roaster according to the invention comprises a main container 10 equipped with space in the inner portion; an upper supporter 20 which has a flame hole 21 equipped at the surface facing the lower side of the main container 10 and a roasting plate supporting part 22 equipped at the periphery of the flame hole 21 and which is mounted at the main container 10; a fuel vessel 30 which has a fuel filling part 32 in the inner portion and a spacer 34 equipped at the outer part of the fuel filling part 32 and which is arranged at the position facing the flame hole 21 of the upper supporter 20 as well as is installed at the position separated from the main container 10 by the spacer 34. The lower end portion of the spacer 34 is contacted to the bottom surface 13 comprising the inner space of the main container 10 so that the configuration in which the fuel vessel 30 is arranged at the state discrete from the main container 10 is achieved.

The main container 10 may has a pot shape equipped with the space in the inner portion. At this time, the main container 10 may have lower container part 10A equipped with a space in the inner portion and a supporting portion for hanging the upper supporter 20 in the upper part, and upper container part 10B detachably combined in the upper portion of the lower container part 10A.

The projection part is consecutively equipped in the upper circumference of the upper container part 10B. The lower part of the upper supporter 20 is mounted on the projection part. Accordingly, the invention may have the configuration wherein the upper supporter 20 may be combined at the upper position of the main container 10. Moreover, the upper container part 10B has the consecutively continued hanger projection at the position which is more higher than the position of the projection part. The hanger piece extended to the lower side in the upper part side of the lower container part 10A is mounted on the hanger projection so that the main container 10 may be configured in the structure wherein the lower container part 10A is hung on the upper part of the upper container part 10B. The contact part of the lower container part 10A and the upper container part 10B are welded together so that the upper container part 10B is integrally fixed on the lower container part 10A.

The lower container part 10A can be formed with the jar shape that the upper portion is open. Two cap binding holes which is symmetrical based on the central part are formed in the lower container part 10A. And the hand insert cap 11 is combined with the cap binding holes. At this time, the hand insert cap 11 is formed in cap shape which has the opening part in the top end so that the user put his/her hand into the hand insert cap. It becomes the form that the hand insert cap 11 enters into the inside of the lower container part 10A in the state where the hand insert cap 11 is inserted in the cap binding hole of the lower container part 10A. The user can put hand inside two symmetrical hand insert caps 11 and can move the roaster of the present invention. At this time, the hand insert cap 11 may be formed with the material having low thermal conductance like the synthetic resin so that the user does not feel hot by the hand although the user puts hand into the hand insert cap 11. And the hand insert cap 11 includes through-holes. Air circulates inside and outside of the main container 10 through the through-holes of the hand insert cap 11. In that way, it may be prevented that the hand insert cap 11 becomes hot by the heat generated in the charcoal heating source of the fuel vessel 30.

Space is formed inside of the upper container part 10B. The air blowing hole 18 is equipped in the position facing the flame hole 21 equipped at the central part of the upper supporter 20. And the bottom surface of the inner space of the main container 10 (so to speak, the bottom surface 13 of the upper container part 10B is configured to be closed except for the air blowing hole 18. At this time, the air blowing hole 18 is formed by air supply boss 19 of tube shape. The air supply boss 19 is a part of the air blowing unit. That is, the air supply boss 19 is extended to the upper side through the boss combining hole formed in the central position of the bottom surface 13 so that the air blowing hole 18 is formed inside the air supply boss 19 which is upwardly protruded from the bottom surface 13 of the inner space of the upper container part 10B.

In the present invention includes air blowing unit for blowing the air of constant pressure (the air of necessary pressure that the charcoal filled in the inner fuel charge area of the fuel vessel 30 is burnt well) to the internal space of the upper container part 10B (in other words, the internal space of the main container 10). At this time, the air blowing unit comprises a case 16 forming the air supply space connected with the air blowing hole 18, air supply boss 19 which is positioned in the case 16 to be protruded to the upper portion of the bottom surface 13 of the main container 10, and a ventilation fan 17 which is supported in the case 16 in order to be connected with the air supply boss 19, and wherein the fuel vessel 30 is admitted inside the main container 10 to be arranged in the upper position of the air blowing unit, the combining hole 35h formed on the bottom surface of the fuel vessel 30 is connected to the air supply boss 19 so that the fuel vessel 30 may be steadily arranged inside the main container 10 as well as the inner portion fuel charge area unit is connected to the inner portion of the air supply boss 19.

In other words, the boss combining hole 35h is provided at the central location of the upper container part 10B of the main container 10. The air supply boss 19 is inserted in the boss combining hole 35h formed on the upper container part 10B and is fixed by the fixing means. Accordingly, the air blowing unit consisted of the case 16 etc. is arranged between the bottom surface of the upper container part 10B and the upper side of the lower container part 10A of the main container 10. Therefore, the air blowing hole 18 connected with the ventilation fan 17 arranged in the internal space of the lower container part 10A is penetrated toward the bottom surface from the upper side of the internal bottom surface 13 in the main container 10. In the meantime, a supporting board 17a is combined in the bottom part of the lower container part 10A. The hole connected with the space of the inner portion is formed at the bottom part of the lower container part 10A. The supporting board 17a is combined in the hole formed at the bottom of the lower container part 10A. A plurality of holes is provided at the supporting board 17a. When the ventilation fan 17 arranged in the inner space of the main container 10 is being rotated, air may flow in the inner space of the main container 10. At this time, the hole takes the structure of being arranged along the columnar direction as the constant interval based on the central part of the supporting board 17a. In the meantime, the ventilation fan 17 is installed at the place near the boss combining hole formed at the case 16 by the support means like as bracket and bolt or wire etc. The fan motor of the ventilation fan 17 is connected electrically to the battery 14a installed inside the main container 10 by means of battery case 14. Speed controller 44 is mounted on the specified position (exactly speaking, the specified position of the lower container part 10A) of the main container 10. Blast control lever (the control lever which controls the amount of wind as rotary dial type) is mounted on the main container 10. Blast control lever is protruded on the outer surface of the main container 10. Blast control lever is connected to the speed controller 44 by circuits. The rotational force of the ventilation fan 17 is controlled with the rotation operation of the blast control lever of the speed controller so that the air supply amount necessary for the fuel burn may be controlled properly. When the ventilation fan 17 rotates, the outside air is supplied through the hole of the supporting board 17a equipped in the bottom of the main container 10 so that air necessary for the fuel burn can be supplied to the inner portion of the fuel vessel 30 (to be described below) through the ventilation fan 17 and the air blowing hole 18 formed in the inner portion of the air supply boss 19 which is connected to the upper portion from the bottom surface 13 of the internal space of the main container 10. At this time, said ventilation fan 17 is combined to the inner space of the upper container part 10B which is the main part of the main container 10 by the supporter like bracket, the air supply boss 19 equipped in the case 16 is combined in the boss combining hole 35h formed in the bottom surface 13 of the main container 10, and the ventilation fan 17 is arranged at the state downwardly inclined about the bottom surface of the upper container part 10B with a certain angle. And the chamber part isolated from the outside by the case 16 is formed between the bracket which supports the ventilation fan 17 and the upper container part 10B. Accordingly, the air blown from the ventilation fan 17 may pass through the chamber part formed by the case 16 and may directly flow up toward the inner space of the fuel vessel 30 through the air blowing hole 18 of the main container 10. The air blown from the ventilation fan 17 does not leak toward the other position. In the meantime, the ventilation fan 17 is arranged to slope upward about the bottom surface 13 of the main container 10 (in other words, the bottom surface 13 of the upper container part 10B) by a predetermined angle. When blowing air with the ventilation fan 17, the ascending current appears and the rising supply of air is promoted. Therefore, air supply to the fuel vessel 30 is more smoothly made. And the combustion efficiency can be more improved.

The supporting board 17a can be combined in the bottom part of the lower container part 10A. The hole connected with the space of the inner portion is formed in the bottom part of the lower container part 10A and the supporting board 17a is combined in the hole formed at the bottom part of the lower container part 10A. And, the supporting board 17a may have the hole in which air is flowed in the rotation of the ventilation fan 42 arranged in the inner space of the main container 10. At this time, the hole can take the structure of being arranged along the columnar direction as the constant interval based on the central part of the supporting board 17a.

The upper supporter 20 is detachably combined in the upper end portion of the main container 10. The upper supporter 20 has flame hole which penetrate from the upper surface to the lower surface at the center. Tray 26 which is continued to be closed-loop shape at the lower position of the roasting plate supporting part 22 is provided in the circumference of the flame hole 21. The outer circumference part of the roasting plate 4 lies on the roasting plate supporting part 22 of the upper supporter 20. Moreover, the upper supporter 20 has a plurality of circulating air through-holes 23 based on the central part. Overheat of the air supporter 20 is prevented while air circulates through this circulating air through-holes 23 to inside and outside of the upper supporter 20.

At this time, the upper supporter 20 can be formed by the method of curling work and so on in order that the tray 26 and the roasting plate supporting part 22 become one body. The curl portion is formed in the lower end portion of the upper supporter 20 which is placed on the projection part of the main container 10, and the curl portion is also formed in the end portion of the flame hole 21 positioned at the central part of the upper supporter 20. This curl portion removes the sharp part in the upper supporter 20 so that it is safe to handle the upper supporter as well as the upper supporter 20 is not twisted owing to heat of the flame. The shape of the container may be strongly maintained without affect of heat.

The invention has the fuel vessel 30 equipped with the fuel filling part 32 in the inner portion. At this time, the fuel vessel 30 has the spacer 34 equipped in the outer periphery position of the fuel filling part 32. The fuel vessel 30 is installed in the main container so that the fuel vessel 30 be arranged in the position which is in opposite directions to the flame hole 21 of the upper supporter 20. The bottom side of the fuel vessel 30 is spatially located from the surface of the main container 10 by the spacer 34 extended toward the lower direction from the bottom side of the fuel vessel 30.

In the present invention, the fire fuel vessel 35 is combined in the upper container part 10B comprising the main container 10. The fire fuel vessel 35 is formed of the cylinder pot-shape of which the upper end portion is opened. And center downward projection groove portion 35a is provided at the bottom part of the fire fuel vessel 35. The diameter between the inner wall of the center downward projection groove portion 35a is relatively shorter than that of the other part. And the upper position of the center downward projection groove portion 35a is provided with the spacer supporting part 35b. Moreover, the central part of the fire fuel vessel 35 (specifically, the center of the bottom part of the downward projection groove portion) may be provided with the combining hole 35h for being inserted in the air supply boss 19 comprising the air blowing unit. And the peripheral wall around the combining hole 35h is extended to the upward direction so that the fire fuel filling groove 35c of ditch shape is formed around the combining hole 35h of the fire fuel vessel 35 and alcohol or the solidity fire fuel etc is charged in this fire fuel filling groove 35c.

The upper end portion of the space 34 is combined in the spacer supporting part 35b comprising the bottom part of the fire fuel vessel 35. Multiple spacers 34 are arranged in the spacer supporting part 35b of the fire fuel vessel 35 based on the central part as the radial direction.

Therefore, in the state the fire fuel vessel 35 is accommodated in the internal space of the main container 10, only the lower end portion of the spacer 34 is contacted with the bottom surface 13 of the main container 10 (specifically, the bottom surface 13 of the upper container part 10B) so that the lower part of the fire fuel vessel 35 is spatially located in the bottom surface 13 of the main container 10. That is, center downward projection groove portion 35a of which the diameter is relatively shorter than that of the other part is provided at the bottom part of the fire fuel vessel 35, the upper position of the center downward projection groove portion 35a is provided with the spacer supporting part 35b, and multiple spacers 34 are equipped in the spacer supporting part 35b. Accordingly, only the lower end portion of the spacer 34 is partly contacted with the internal bottom surface 13 of the main container 10 and the bottom side and sidewall part of the fire fuel vessel 35 are arranged respectively as the state spatially located in the bottom surface 13 and side of the main container 10.

Moreover, the state that the other part besides the lower part of the fire fuel vessel 35 is spaced from the main container 10. At this time, the combining hole 35h of the central part of the fire fuel vessel 35 is combined in the air supply boss 19 of the air blowing unit so that the fire fuel vessel 35 is steadily arranged in the combination position without the phenomenon it is contacted with the main container 10 owing to sway.

In the meantime, the spacer 34 is formed of rod shape which has the regular length as well as the projection part may be formed at the upper circumference of the spacer 34. And the bottom part of the fire fuel vessel 35 includes the spacer fixing hole. If the upper part of the spacer 34 is inserted in the spacer fixing hole formed in the bottom part of the fire fuel vessel 35, the projection part of the outer periphery of the spacer 34 hangs on the bottom part bottom surface of the fire fuel vessel 35. If the upper side terminal of the spacer 34 protruded to the inner portion of the fire fuel vessel 35 is pressed to be extended to side portion so that the spacer fixing piece 35b is formed. Accordingly, the spacer 34 is steadily fixed in the spacer supporting part 35b of the fire fuel vessel 35 by the projection part hanging on the outer surface of the bottom part of the fire fuel vessel 35 and the spacer fixture piece hanging in the inside of the fire fuel vessel 35. Accordingly, the coupling structure between the fire fuel vessel 35 and the spacer 34 may be simple and the task for the coupling structure formation is rapidly done by this mode.

Moreover, the lever latch 39 is equipped in one side of the fire fuel vessel 35, the lever (not shown) is set up on the lever latch 39 and the user may carry out the fire fuel vessel 35 from the main container 10.

And, the curl portion can be equipped in the upper end portion of the fire fuel vessel 35. The curl portion of the upper end of the fire fuel vessel 35 removes the sharp part in the fire fuel vessel 35 and even when handling the fire fuel vessel 35 is safe and the phenomenon that the fire fuel vessel 35 is twisted with the heat of the flame is prevented.

Moreover, the fuel vessel 30 is mounted in the inside of the fire fuel vessel 35 and it is arranged inside the main container 10. At this time, the upper portion the fuel vessel 30 is comprised of the cylinder pot-shape whose upper portion is open. The outer circumference of the upper portion of this fuel vessel 30 is disposed to face the inner circumference of the flame outlet of the upper supporter 20 as well as it is arranged as the state separated in a predetermined interval with the inner periphery of the flame outlet.

The downward projection groove portion 32a may be formed at the bottom part of the fuel vessel 30. The diameter between the inner wall surface of the downward projection groove portion 32a is relatively shorter than that of the other part. And it becomes the state where the downward projection groove portion 32a of this fuel vessel 30 is inserted in the center downward projection groove portion 35a of the fire fuel vessel 35. Therefore the state where the fuel vessel 30 is steadily arranged in the fire fuel vessel 35 without sway and the upper circumference of the fuel vessel 30 is separated in a fixed interval with the inner circumference of the flame outlet of the upper supporter 20 can be maintained. And since this spacing state is maintained, the phenomenon may be more certainly prevented that the heat of the fuel which is burnt in the fuel vessel 30 is delivered to the upper supporter 20 and the main container 10.

Moreover, the upper end portion of the fire fuel vessel 35 is arranged near the flame hole 21 formed at the upper supporter 20 as well as is arranged as the state separated in a fixed interval on the surface of the upper supporter 20. The downward projection groove portion 35a of the fire fuel vessel 35 is arranged as the state separated in a fixed interval due to the spacer 34 from the internal space bottom surface 13 of the main container 10 and the combining hole 35h of the fire fuel vessel 35 is inserted in the air supply boss 19 fixed to the main container 10. Therefore the fire fuel vessel 35 may steadily arranged inside the main container 10 as well as be spaced from the main container 10 and upper supporter 20. And since this spacing state is maintained, it can be more authentically prevented the phenomenon that the heat of the fuel which is burnt in the fuel vessel 30 (exactly speaking, the fuel vessel 30) is delivered through the fire fuel vessel 35 to the upper supporter 20 and main container 10.

Moreover, the lever latch 31 formed by the work method of cutting toward the inside is equipped in one side of the fuel vessel 30. The user may set up the lever on the lever latch 31 and carry out the fuel vessel 30 from the main container 10.

And the curl portion is also provided in the upper end portion of the fuel vessel 30. By the curl portion, the sharp part may be removed to be safe for handling and the curvature phenomenon etc owing to heat may be prevented.

At this time, in the bottom part of the fuel vessel 30, the air guide part which guides so that the air blown up from the ventilation fan 17 rise up to the inner portion of the fuel vessel 30 and the air hole 37 which guides so that the rising air by the air guide part may be blown into the inner portion of the fuel vessel 30. At this time, the bottom part of the fuel vessel 30 is comprised of the dome-shaped convexly protruded to the upper side, the air guide part includes multiple guide wing parts 38W of groove type which are comprised of the dome-shaped convexly protruded to the upper side and the height from the base end part to the top end part becomes gradually higher and which are arranged as the windmill equation wing shape around the radial direction based on the central part of the bottom part of the fuel vessel 30. And the air hole 37 comprises the multiple air hole groups in which the diameter becomes gradually smaller to the direction which becomes estranged from one side position of the top end part of the guide wing part 38W while being arranged in one side position of the top end part of the guide wing part 38W.

Therefore, the blown air upwardly goes up with the rotation of the ventilation fan 17 through the air blowing hole 18 of the air supply boss 19 inserted in the combining hole 35h of the bottom part of the fire fuel vessel 35, and the air blown up from the ventilation fan 17 is crashed to the outer lower surface of the bottom portion of the fuel vessel 30, rotates along the guide wing part 38W like as windmill and is blown into the inner portion of the fuel vessel 30 through the respective air holes 37. Accordingly, oxygen is evenly supplied to all of the fuel (in the present invention, the charcoal mainly very much used as the direct fire meat roasting) filled in the fuel vessel 30, the combustion of fuel is evenly comprised as well as the combustion efficiency is more enhanced. In the result, the direct fire efficiency of food is more enhanced.

Moreover, the fuel vessel 30 includes the hanging support part which is extended to the radius outer direction as well as is extended to the horizontal direction at the higher position than the bottom part in which the air hole 37 is formed, and the section contact unit 33 of projection type more protruded to the lower side is equipped in the hanging supporting part. This section contact unit 33 is contacted to the upper side of the spacer supporting part 35b of the fire fuel vessel 35 and the remnant side and the outer periphery of the hanging supporting part are located in the fire fuel vessel 35. The remnant side and the outer periphery of the hanging supporting part may have the space which is not contacted to the fire fuel vessel 35. Therefore, when the fuel (in the present invention, charcoal is used as fuel) filled in the fuel vessel 30 is burnt, the amount of the heat delivered to the fire fuel vessel 35 may be minimized sufficiently.

In other words, the center downward projection groove portion 35a the diameter of which is shorter than that of the other part may be formed at the bottom part of the fire fuel vessel 35, the spacer supporting part 35b is formed in the upper position of the center downward projection groove portion 35a, and the spacer supporting part 35b is arranged to be contacted to the section contact unit 33 of embossing form which is protruded downwardly from the upper part of the fuel vessel 30. Accordingly, because the state may be acquired that the contact surface between the fuel vessel 30 and the fire fuel vessel 35 is minimized, the amount of the heat transferred from the fuel vessel 30 to the fire fuel vessel 35. And the fire fuel vessel 35 is located to have predetermined space from the main container 10 by the spacer 34 provided at the lower part. Therefore, in the result, the extent in which the heat is delivered from the fuel vessel 30 to the other part like the main container 10 is minimized.

Moreover, the invention can further include roasting grill 80 installed on the upper supporter 20, and secondary roasting plate 86 which is installed at the roasting grill 80 and covers the fuel vessel 30 installed in order to be connected with the upper supporter 20. At this time, the roasting grill 80 includes the placing part 81 of predetermined area in which multiple linear type wires are connected to the inner position of the ring-shaped border wire. And in the roasting grill 80, the secondary roasting plate supporting member 82 is equipped in the position which is in opposite directions to the flame hole 21 of the central part of the upper supporter 20 and the fuel vessel 30. The circumference of the supplementary roasting plate 86 is supported by the secondary roasting plate supporting member 82 so that the roasting grill 80 may be placed on the position covering the fuel vessel 30.

The secondary roasting plate 86 has panel structure the central part of which is comprised of the convex dome shape, multiple flame holes are formed in the secondary roasting plate 86, and the area of the secondary roasting plate 86 can cover the flame hole 21 of the upper supporter 20. And although oil is generated from the meat when the meat is put on the secondary roasting plate 86 and is being baked, the oil does not fall down to the fuel vessel 30 in which charcoal is filled but is oozed to the oil receiver tray 26 provided at the periphery of the flame hole 21 of the upper supporter 20. At this time, the supplementary roasting plate 86 may include the roasting plate body, the fire hole provided at the roasting plate body, the cover protrusion piece 28 which hides the fire hole of the roasting plate body at the upper position and forms the flame hole connecting some part of the fire hole to the upper side from the bottom surface of the roasting plate body, the blocking protrusion 32 which is equipped in the end forming the fire hole part of this cover protrusion piece and protects the oil of the meat baking in the upper part of the roasting plate body from flowing into the flame hole part. Moreover, the upper side of the roasting plate body is comprised of the roast surface the central part of which is bulging to the upper portion and slopes downward to the outer side of the radius direction, and the top-end part and both end parts of the cover protrusion piece facing the central part of the roasting plate body are connected to the roasting plate body and the blocking protrusion is equipped in the base part of the cover protrusion piece and the flame hole part is formed between the base part of the blocking protrusion and the fire hole. And the second blocking protrusion which is arranged in the lower position of the blocking protrusion and is extended upwardly may be provided while the heat of fire ball of the roasting plate body is arranged in the fire hole of the roasting plate.

Therefore, the oil which is generated when roasting the meat put on the supplementary roasting plate 86 may be blocked by the blocking protrusion and the second blocking protrusion and cannot come to the flame hole part of the secondary roasting plate 86 and it below flows to be collected in the tray 26 of the upper supporter 20. That is, the oil which is generated when roasting meat does not run out from the fire hole part of the secondary roasting plate 86 towards the charcoal fire and the oil oozes to the tray 26 of the upper supporter 20 to be collected.

In the meantime, the supplementary roasting plate supporting member 82 is the ring shape wire while the supplementary roasting plate 86 is comprised of the circular plate shape. And in the state where the secondary roasting plate 86 is put on the central part of the placing part 81 of the roasting grill 80, the state where the secondary roasting plate 86 is steadily arranged among the center of the roasting grill 80 can be maintained by the secondary roasting plate supporting member 82 of the ring shape wire structure.

Moreover, the wire handle 84 wherein the lower part side is contacted with the upper supporter 20 to make the placing part 81 spaced from the upper portion of the upper supporter 20 and the upper part side can be utilized as the gripping lever is further provided in the circumference of the roasting grill 80. In the present invention, two columnar wire handles 84 are equipped. The user may grip the upper side columnar wire 84a of the wire handle 84 by hand in order to handle the roasting grill 80. That is, the user may grip the upper side columnar wire 84a of two columnar wire handles 84 by both hands to lift up the roasting grill 80 or place the roasting grill 80 on the upper supporter 20. Moreover, the columnar wire 84b of the columnar wire handle 84 may put on the roasting plate supporting part 22 of the projection form of the upper supporter 20 to make the roasting grill 80 set steadily in the upper supporter 20 as well as to make the thermal conductivity minimized.

Moreover, the invention may further include the wire grill 90 which is supported in the upper supporter 20 and is installed to be attachable and detachable. At this time, the wire grill 90 comprises wire grill panel portion 92 which is comprised of the structure arranged in the concentric and is installed in order to face the inner space of the upper supporter 20, a plurality of wire feet 94 which is installed in the wire grill panel portion 92 and has wire support piece 94a prolonged toward the lower direction, and wherein the wire support piece 94a is contacted to the roasting plate supporting part 22 equipped in the upper supporter 20. Multiple wire feet 94 may be arranged as the radial direction based on the central part of the panel portion 92. The invention may have the structure that three wire feet 94 are arranged along radial direction based on the central part of the panel portion 92 as the constant interval.

Therefore, after the roasting plate 4 may be lifted up form the upper supporter 20 and the wire support piece 94a equipped in the wire foot 94 of the wire grill may be placed on the roasting plate supporting part 22 of the projection form protruded to the center direction in the inner periphery of the upper supporter 20, the wire grill panel part 92 may be placed on the upper supporter 20.

According to the invention of the above configuration, in orderly manner, the main container 10, the fire fuel vessel 35, the fuel vessel 30 and the upper supporter 20 are combined in the lower part, the roasting plate 4 is combined in the upper supporter 20, and if necessary, the lid 2 is combined with the lid supporting part equipped in the upper supporter 20. And then, the spacer 34 extended to the lower part of the fire fuel vessel 35 is contacted to the bottom surface 13 of the internal space of the main container 10, the bottom surface 13 of the fire fuel vessel 35 is arranged to be spaced from the main container 10, and the fuel vessel 30 is admitted inside the fire fuel vessel 35 and the internal space bottom surface 13 is arranged to be spatially separated from the upper supporter 20 and main container 10.

In this state, the roasting plate 4 may be placed on the roasting plate supporting part 22 of the upper supporter 20 in the state putting fuel (the fire fuel may be employ the fuel of the general purpose like alcohol or the solid fuel) for the fire (ignition) on the concave fire fuel filling groove 35c equipped in the fire fuel vessel 35, firstly the fire fuel may be lighted, the water of predetermined height may be filled in the tray 26 equipped in the upper supporter 20. And after the charcoal fuel is filled in the fuel vessel 30, if the fuel vessel 30 in which charcoal is filled is combined in the fire fuel vessel 35, the charcoal filled in the fuel vessel 30 may be ignited by the fire of the fire fuel (of course, the charcoal may be ignited by blowing air by the ventilation fan 17). The burning charcoal may become the start flame source, and the user may roast food (the boned rib etc) put on the roasting plate 4 by the heat of this flame as direct fire type. And the oil generated from the roasting meat etc is collected in the tray 26 equipped in the upper supporter 20.

At this time, the important point of the invention is that the contact area between the fuel vessel 30 and the main container 10 may be minimized, the heat of the flame is to the utmost a lot delivered to the roasting object food, the heat of the flame is to the utmost a little bit delivered to the around and the thermal efficiency is raised. Therefore, the invention may be used in the outdoor and in the indoor including the general home etc in the state which is safe and convenient. That is, as described above, the spacer 34 extended to the lower side is equipped in the bottom part of the fire fuel vessel 35, only the lower end portion of the spacer of the fire fuel vessel 35 is contacted to the bottom surface 13 of the main container 10 while the remaining part of the fire fuel vessel 35 except for the lower end portion of the spacer 34 is spaced from the main container 10 as well as the fuel vessel 30 is arranged to be spaced from the main container 10 and the upper supporter 20. Accordingly, the sate that the heat generated while the charcoal fuel is burnt in the fuel vessel 30 is not delivered to the other part except the part roasting meat and the main container 10 itself is not hot may be maintained. Therefore the state is good for the safety side or the thermal efficiency side.

And the invention is good for the portability like as the user move the roaster of the invention to another place to use etc because the main container 10 supporting the part roasting meat may be maintained in the state that is not hot but cold or normal temperature. In this respect, the invention has another advantage. In other words, since the normal temperature state that the heat is not delivered to the other part (in other words, the main container 10 part) except the part which roasts meat may be maintained sufficiently, there is no case that the user may get burnt in the hand even when he/she grips the main container by the hand in order that he/she moves the roaster of the invention to desired place (for example, the outdoor to the indoor or the outdoor to the indoor) and therefore the invention may provide the convenience etc like as the user may move to necessary place and roast meat to eat. That is, the invention be excellent as to the portability of the food cooking place. In this point, the invention has great meaning. Particularly, in the present invention, the fire fuel vessel 35 supporting the fuel vessel 30 at the lower position is contacted to the fuel vessel 30 by the section contact part 33 of embossing annular projection form protruded to the lower part of the fuel vessel 30 at least area and the heat transmission from the fuel vessel 30 to the fire fuel vessel 35 may be minimized while the fire fuel vessel 35 is spaced form the main container 10 as well as only the lower end portion of the spacer 34 for the support is contacted to the bottom surface 13 of the inner portion of the main container 10 so that the contact area between the fire fuel vessel 35 and the main container 10 may be minimized. Therefore, in the result, when the charcoal fuel is burnt, the heat from the fuel vessel 30 and the fire fuel vessel 35 is to the utmost a little bit delivered and the safety in use is maximized. The invention is very important in the point that the structure of the safety enhancement due to the minimum of this thermal conduction etc may be to the utmost simple.

In the meantime, the upper supporter 20 supporting the roasting plate 4 and the main container 10 may be configured to maintain the state combined with each other by the locking device 70. In the present invention, the locking device 70 may be provided in the outer periphery of the upper supporter 20. And it is comprised of the locking hook which is provided in the outer periphery of the upper supporter 20 and is equipped with the locking holding portion, and locking hanger which is rotatably coupled in the main container 10 by the medium of the hinge section. In the end portion of the locking hanger, the locking projection interlocked in the locking holding portion of the locking hook is provided. If the locking hanger is downwardly circulated around the hinge section, the locking projection of the locking hanger hangs on the locking holding portion of the locking hook so that the locking state may be maintained. Moreover, the locking device 70 includes the locking piece which is rotatably coupled in the outer periphery of the upper supporter 20 by the medium of the hinge section and is equipped with the locking hole and the locking latch piece equipped in the outer periphery of the main container 10. If the locking piece is downwardly rotated based of the hinge section, the locking hole of the locking piece may be combined in the locking latch piece protruded to the outer periphery of the main container 10 so that the locking operation may be maintained. Like the above, all of the means to lock together the upper supporter 20 for supporting the roasting plate 4 and the main container 10 may be adopted as the locking device 70.

In the meantime, in the present invention, the blown air with the rotation of the ventilation fan 17 upwardly goes up through the air blowing hole 18 of the air supply boss 19 inserted in the combining hole 35h of the bottom part of the fire fuel vessel 35, and the air blown up from the ventilation fan 17 is crashed to the outer lower surface of the bottom portion of the fuel vessel 30, rotates along the guide wing part 38W like as windmill (whirlpool rotation) and is blown into the inner portion of the fuel vessel 30 through the respective air holes 37. Accordingly, oxygen is evenly supplied to all of the fuel (in the present invention, the charcoal mainly very much used as the direct fire meat roasting) filled in the fuel vessel 30, the combustion of fuel is evenly comprised as well as the combustion efficiency is more enhanced. In the result, the direct fire efficiency of food is more enhanced. In addition to this, since the air supply boss 19 and the air blowing hole 18 by the air supply boss 19 are arranged in the lower central part position of the fuel vessel 30 as the direct direction and air intensively goes up to the central part of lower side position of the fuel vessel 30, the fuel combustion efficiency may be improved more. This point is one of the characteristics of the invention.

Moreover, in the present invention, in the upper portion of the fire fuel vessel 35, the cover member may be more equipped. The penetration hole connected with the inner portion of the fire fuel vessel 35 may be equipped in this cover member 60. The penetration hole is penetrated from the upper surface toward the bottom surface of the cover member. Multiple penetration holes may be formed in the total surface of the cover member. And, the flange part extended toward the outer side of the radius direction may be further provided in the circumference of the cover member. At this time, the flange part of the cover member is arranged beneath the flame hole 21 formed in the central part of the upper supporter 20 and the cover member covers the upper side opening of the fire fuel vessel 35. The flange part of the cover member hangs on the peripheral wall of the flame hole of the upper supporter 20. In the present invention, the external diameter of the flange part of the cover member is relatively greater than that of the flame hole 21 of the upper supporter 20. The flange part of the cover member hangs on the peripheral wall of the surrounding of the flame hole 21 in the lower position of the flame hole 21 of the upper supporter 20. In the meantime, in drawing, it is illustrated that the penetration hole of the cover member is formed with the circular form. But the shape of the penetration hole may be comprised of the other form. That is, the penetration hole of the cover member may be organized in the form of the square hall and the penetration hole arranged in the most outer position may be organized in the form of the slot hole. And it should understood that the shape of the penetration hole of the cover member may be selected as the various shapes if necessary besides the above-described shape.

Therefore, in the state the upper supporter 20 is placed on the main container 10 and the roasting plate 4 is placed on the upper supporter 20, the user may roast meat to eat it. Although the case is happened that the user may mistakenly drop down the invention while moving the invention to the desired place and the invention are overturned (exactly speaking, the main container 10, the upper supporter 20 and the roasting plate 4 are overturned), the main container 10 and the upper supporter 20 are maintained to be combined by the locking device 60 and the cover member is maintained to hang on the upper supporter 20 (concretely speaking, the flange part of the circumference of the cover member may be maintained to hang on the upper supporter 20) and the case that the cover member is broken away from the fire fuel vessel 35 is prevented. Therefore the case is prevented that the fuel (for example, charcoal) filled in the fuel vessel 30 spill over so that the user may use the invention more safely and conveniently. That is, the upper side of the fuel vessel 30 is covered up with the cover member so that the flame may be induced to the roasting plate 4 through the penetration hole of the cover member and the safety in use may be guaranteed sufficiently.

In the meantime, according to the invention, the roasting plate 4 is carried out from the upper supporter 20, and the roasting grill 80 and the secondary roasting plate 86 may be set up on the upper supporter 20 instead of the roasting plate 4, meat may be roasted at the same time the stew pot may be heated. The invention may prevent the case that meat is burnt out excessively when the user roasts meat while sharing the chat and may help the user to roast to eat meat more deliciously. That is, after the roasting plate 4 is carried out the upper supporter 20, the roasting grill 80 is set up in the upper supporter 20, the secondary roasting plate 86 is set up in the position which is in opposite directions to the flame hole 21 of the upper supporter 20 and the center of the fuel vessel 30 of the roasting grill 80, and meat may be roasted on the secondary roasting plate 86. When meat is roasted sufficiently to eat, the user may eat the roasted meat or if the user wants to eat the roasted meat later sharing the chat, he/she may place the roasted meat on the placing part 81 (it becomes in the form of the wire mesh) positioned at the outside of the part where the secondary roasting plate 86 is placed on among all the section of the roasting grill 80. Then, the roasted meat placed on the placing part 81 of the roasting grill 80 does not get cold with the indirect heat coming up from the fuel vessel 30 and the appropriately warm state is maintained. Therefore, although the user eat the roasted meat relatively slower while sharing the chat, the taste of meat may not be lost. The user may eat the meat more deliciously. In the mean time, instead of the roasted meat, if the stew pot is placed on the placing part 81 positioned at the outside of the part where the secondary roasting plate 86, the stew pot may maintain the stew at the appropriately warm state with the indirect heat which also comes up from the fuel vessel 30. Therefore, there is the effect that the user may properly enjoy the taste of the stew while eating meat. That is, according to the roasting grill 80 and the secondary roasting plate 86, the user may roast to eat meat as well as may enjoy the pot stew or the soup etc with appropriately warm state. Therefore, the invention may contribute the user to cheerfully take meat. Especially, although time goes by while sharing the chat, there is no case that meat gets cold the stew pot or the soup etc gets cold, the invention may contribute the user to eat meat to the utmost cheerfully.

Moreover, the invention has the advantage that the user may use the invention more usefully when he/she wants to heat to eat the food containing soup like as pot stew more quickly because the invention has the wire grill 90 which is supported in the upper supporter 20 and is installed to be attachable and detachable. That is, after the user roast meat on the roasting plate 4 (or the secondary roasting plate 86) to eat all the meat, carries out the roasting plate 4 from the upper supporter 20, and sets up the wire grill 90 on the upper supporter 20, if he/she puts the stew pot on the central position (the position which is in opposite directions to the flame hole 21 and fuel vessel 30 of the upper supporter 20) of the wire grill 90, the stew in the stew pot may be boiled more quickly so that the user may boil to eat the stew more quickly after he/she eat the roasted meat enough. Moreover, in the wire grill 90, because the top end part (the end opposite to the end equipped with the wire support piece 94*a*) of the wire foot 94 is equipped based on the central part of the wire grill 90 along the columnar direction and the hanging portion formed by the end parts of these wire feet 94 supports the pot like as the stew pot so that the pot may not be shifted and the user may boil to eat the stew etc more safely and conveniently.

Further, the main container 10 called main part of the invention may have multiple air circulating holes which is penetrated toward inside and outside. Since air circulates through this air circulation holes to inside and outside of the main container 10, the conducted heat delivered to the heating source of the fuel vessel 30 is more authentically minimized.

What is claimed is:

1. A roaster comprising:
    a main container including a lower container part, an upper container part, and a first space formed between the lower container part and the upper container part, wherein an air supply hole is formed at a center portion of the upper container part, and an air supply boss is fitted into the air supply hole;
    a ventilation fan disposed inside the first space of the main container, wherein air from the ventilation fan flows upwards through the air supply boss;
    a fire fuel vessel disposed on the main container, wherein the fire fuel vessel includes a spacer formed at a bottom surface thereof to form a second space between the main container and the fire fuel vessel so as to minimize heat transfer from the fire fuel vessel to the main container, and a boss combining hole formed at a center portion thereof through which the air supply boss passes;
    an upper supporter disposed on the main container with the fire fuel vessel positioned underneath the supper supporter, wherein the upper supporter includes a flame hole formed at a center portion thereof, and a roasting plate supporting part formed at an outer circumferential portion of the flame hole; and
    a fuel vessel disposed inside of the fire fuel vessel and passing through the flame hole of the upper supporter, wherein the fuel vessel includes a bottom portion spaced apart from a bottom portion of the fire fuel vessel to form a third space, a plurality of air holes are formed at the bottom portion of the fuel vessel, and the air from the ventilation fan flows through the air supply boss via the third space through the air holes to fuel contained in the fuel vessel,
    wherein the fuel vessel is configured to be disposed inside and removed from the fire fuel vessel through the flame hole of the upper supporter.

2. The roaster of claim 1, wherein the spacer is extended from the bottom surface of the fire fuel vessel toward the main container.

3. The roaster of claim 1, wherein an upper end portion of the fuel vessel protrudes above the flame hole of the upper support.

4. The roaster of claim 1, further comprising a roasting grill disposed on the upper supporter.

5. The roaster of claim 1, further comprising a roasting plate disposed on the upper supporter.

* * * * *